United States Patent
Yang et al.

(10) Patent No.: US 10,311,149 B1
(45) Date of Patent: Jun. 4, 2019

(54) NATURAL LANGUAGE TRANSLATION DEVICE

(71) Applicant: GYRFALCON TECHNOLOGY INC., Milpitas, CA (US)

(72) Inventors: Lin Yang, Milpitas, CA (US); Patrick Z. Dong, San Jose, CA (US); Catherine Chi, Cupertino, CA (US); Charles Jin Young, Milpitas, CA (US); Jason Z Dong, San Jose, CA (US); Baohua Sun, Fremont, CA (US)

(73) Assignee: Gyrfalcon Technology Inc., Milpitas, CA (US)

( * ) Notice: Subject to any disclaimer, the term of this patent is extended or adjusted under 35 U.S.C. 154(b) by 0 days.

(21) Appl. No.: 16/058,801

(22) Filed: Aug. 8, 2018

(51) Int. Cl.
  *G06F 17/28* (2006.01)
  *G06N 3/08* (2006.01)
  *G06F 17/27* (2006.01)

(52) U.S. Cl.
  CPC ......... *G06F 17/289* (2013.01); *G06F 17/277* (2013.01); *G06F 17/2818* (2013.01); *G06F 17/2854* (2013.01); *G06N 3/08* (2013.01)

(58) Field of Classification Search
  CPC ....... G10L 15/083; G10L 3/07; G10L 15/142; G10L 15/28; G10L 15/30; G10L 15/32; G06F 17/28; G06F 17/271; G06F 17/274; G06F 17/273; G06F 17/10; G06F 17/153; G06F 17/275; G06F 17/277; G06F 17/2775; G06F 17/2785; G06F 17/2705; G06F 17/2735; G06F 17/276; G06F 17/279; G06F 17/2881; G06N 3/0454; G06N 3/063; G06N 3/04; G06N 3/0481; G06N 3/0436; G06N 3/0445; G06N 3/08; G06N 3/0635; G06N 3/049; G06N 3/06; G06N 3/084; G06N 7/005; G06K 9/4628; G06K 9/00986; G06K 9/68; G06K 2209/01; G06K 2209/15;
  (Continued)

(56) References Cited

U.S. PATENT DOCUMENTS 5,140,670 A  8/1992  Chua et al.
5,355,528 A  10/1994 Roska et al.
(Continued)

OTHER PUBLICATIONS

Liang et al., "Text feature extraction based on deep learning: a review.", EURASIP Journal on Wireless Communications & Networking; Dec. 15, 2017, vol. 2017 Issue 1, pp. 1-12, 12 pages, 2017. (Year: 2017).*

(Continued)

*Primary Examiner* — Vijay B Chawan
(74) *Attorney, Agent, or Firm* — RC Patent Services

(57) ABSTRACT

Natural language translation device contains a bus, an input interface connecting to the bus for receiving a source sentence in a first natural language to be translated to a target sentence in second natural language one word at a time in sequential order. A two-dimensional (2-D) symbol containing a super-character characterizing the i-th word of the target sentence based on the received source sentence is formed in accordance with a set of 2-D symbol creation rules. The i-th word of the target sentence is obtained by classifying the 2-D symbol via a deep learning model that contains multiple ordered convolution layers in a Cellular Neural Networks or Cellular Nonlinear Networks (CNN) based integrated circuit.

20 Claims, 32 Drawing Sheets

(58) Field of Classification Search
CPC .... G06K 9/00872; G06K 9/3258; G06K 9/46; G06K 9/4609; G06K 9/6267; G06K 9/6272; G06K 9/6271
USPC ..... 704/9, 260, 258, 10, 254, 268, 269, 277, 704/2; 382/187, 177, 186, 228; 706/38, 706/29, 31, 17
See application file for complete search history.

(56) References Cited

U.S. PATENT DOCUMENTS

| | | | |
|---|---|---|---|
| 6,047,276 | A | 4/2000 | Manganaro et al. |
| 6,519,363 | B1* | 2/2003 | Su .......................... G06K 9/68 382/177 |
| 6,665,436 | B2 | 12/2003 | Su et al. |
| 6,754,645 | B2 | 6/2004 | Shi et al. |
| 6,941,513 | B2* | 9/2005 | Meystel ................ G06F 17/279 715/256 |
| 8,321,222 | B2* | 11/2012 | Pollet ....................... G10L 13/07 379/88.03 |
| 8,726,148 | B1 | 5/2014 | Battilana |
| 9,026,432 | B2 | 5/2015 | Zangvil |
| 9,418,319 | B2 | 8/2016 | Shen et al. |
| 9,665,799 | B1 | 5/2017 | Munteanu et al. |
| 9,613,001 | B2 | 8/2017 | Herrero Abellanas et al. |
| 10,083,171 | B1* | 9/2018 | Yang ....................... G06N 3/063 |
| 10,102,453 | B1* | 10/2018 | Yang ..................... G06K 9/6277 |
| 2003/0108239 | A1 | 6/2003 | Su et al. |
| 2003/0110035 | A1* | 6/2003 | Thong .................. G10L 15/083 704/254 |
| 2007/0292047 | A1 | 12/2007 | Jiao et al. |
| 2008/0126078 | A1* | 5/2008 | Starkie ................. G06F 17/271 704/9 |
| 2008/0130996 | A1* | 6/2008 | Sternby ............. G06K 9/00416 382/179 |
| 2009/0048841 | A1* | 2/2009 | Pollet ...................... G10L 13/07 704/260 |
| 2010/0158394 | A1 | 6/2010 | Chang et al. |
| 2010/0223219 | A1 | 9/2010 | Kato et al. |
| 2010/0286979 | A1* | 11/2010 | Zangvil ................ G06F 17/273 704/9 |
| 2011/0239032 | A1 | 9/2011 | Kato et al. |
| 2013/0002553 | A1* | 1/2013 | Colley ................. G06F 3/0236 345/161 |
| 2013/0060786 | A1* | 3/2013 | Serrano ............ G06F 17/30277 707/749 |
| 2014/0040270 | A1 | 2/2014 | O'Sullivan et al. |
| 2014/0355835 | A1* | 12/2014 | Rodriguez-Serrano ...................... G06K 9/72 382/105 |
| 2015/0036881 | A1* | 2/2015 | Sharma .................. H04W 4/70 382/103 |
| 2015/0178246 | A1 | 6/2015 | Herrero Abellanas et al. |
| 2015/0193431 | A1* | 7/2015 | Stoytchev ............... G06F 19/18 704/9 |
| 2016/0019459 | A1 | 1/2016 | Audhkhasi et al. |
| 2016/0062947 | A1 | 3/2016 | Chetlur et al. |
| 2016/0093343 | A1 | 3/2016 | Ovsiannikov et al. |
| 2016/0163035 | A1* | 6/2016 | Chang ................... G06K 9/4628 382/149 |
| 2016/0358069 | A1 | 12/2016 | Brothers et al. |
| 2017/0004184 | A1* | 1/2017 | Jain ..................... G06F 17/2735 |
| 2017/0011279 | A1* | 1/2017 | Soldevila ................ G06K 9/66 |
| 2017/0032035 | A1* | 2/2017 | Gao ..................... G06F 16/3347 |
| 2017/0098153 | A1* | 4/2017 | Mao ..................... G06N 3/0445 |
| 2017/0103298 | A1 | 4/2017 | Ling et al. |
| 2017/0103299 | A1 | 4/2017 | Aydonat et al. |
| 2017/0116495 | A1 | 4/2017 | Nomura et al. |
| 2017/0177710 | A1* | 6/2017 | Burlik .................. G06F 16/243 |
| 2017/0200078 | A1 | 7/2017 | Bichler |
| 2017/0221176 | A1 | 8/2017 | Munteanu et al. |
| 2017/0262962 | A1 | 9/2017 | Rad et al. |
| 2017/0323196 | A1 | 11/2017 | Gibson et al. |
| 2018/0005074 | A1 | 1/2018 | Shacham et al. |
| 2018/0005344 | A1 | 1/2018 | Lim et al. |
| 2018/0018562 | A1* | 1/2018 | Jung ......................... G06N 3/08 |
| 2018/0060302 | A1* | 3/2018 | Liang ................... G06F 17/277 |
| 2018/0150457 | A9 | 5/2018 | Stoytchev et al. |
| 2018/0150956 | A1* | 5/2018 | Kao .......................... G06T 7/11 |
| 2018/0204111 | A1* | 7/2018 | Zadeh ................. G06N 3/0436 |
| 2019/0042899 | A1* | 2/2019 | Yang ..................... G06K 9/4628 |
| 2019/0095762 | A1* | 3/2019 | Yang ..................... G06K 9/6267 |

OTHER PUBLICATIONS

Xiao et al., "Using convolution control block for Chinese sentiment analysis.", Journal of Parallel & Distributed Computing; Jun. 2018, vol. 116, pp. 18-26, 9 pages, 2018. (Year: 2018).*
Liu et al., "A survey of deep neural network architectures and their applications.", In Neurocomputing Apr. 19, 2017 vol. 23, pp. 11-26, 2017. (Year: 2017).*
Shur et al. "A Corpus of Natural Language for Visual Reasoning", 2017, Facebook AI Research, Menlo Park, CA.
Yoon Kim, "Convolutional Neural Networks for Sentence Classification", Sep. 2014, New York University.
Rastegari et al. "XNOR-Net: ImageNet Classification Using Binary Convolutional Neural Networks", Aug. 2, 2016, Allen Institute for AI, Univ. of Washington.
Gysel et al. "Hardware-Oriented Approximation of Convolutional Neural Networks", Oct. 20, 2016, Department of Electrical and Computer Engineering, University of California, Davis, CA.
L. Chua et al. "Cellular Neural Networks: Theory", IEEE Transactions on Circuits and Systems, vol. 35, No. 10, pp. 1257-1271 Oct. 1988.
L. Chua et al. "Cellular Neural Networks: Applications", IEEE Transactions on Circuits and Systems, vol. 35, No. 10, pp. 1273-1290 Oct. 1988.
Angela Slavova "Applications of Some Mathematical Methods in the Analysis of Cellular Neural Networks", Journal of Computational and Applied Mathematics 114 (2000) 387-404.
Lee et al. "Color Image Processing in a Cellular Neural-Network Environment" IEEE Transaction on Neural Networks, vol. 7, No. 5. pp. 1086-1098 Sep. 1996.
L. Yang et al. "VLSI Implementation of Cellular Neural Networks", IEEE 1990 CH2868-8/90 pp. 2425-2427.
Korekado et al. "A VLSI Convolutional Neural Network for Image Recognition Using Merged/Mixed Analog-Digital Architecture", 2003.
Duan et al. "Memristor-Based Cellular Nonlinear/Neural Network: Design, Analysis, and Applications", IEEE Transactions on Neural Networks and Learning Systems 2014.
"Text feature extraction based on deep learning: a review", Hong Liang, Xiao Sun, Yunlei Sun and Yuan Gao; EURASIP Journal on Wireless Communications & Networking: Dec. 15, 2017, vol. Issue 1, pp. 1-12.
"Using convolution control block for Chinese sentiment analysis", Zheng Xiao, Xiong Li, Le Wang, Qiuwei Yang, Jiayi Du, Arun Kumar Sangaiah; Journal of Parallel & Distrubuted Computing, Jun. 2018, vol. 118, pp. 18-26.
"A survey of deep neural network architectures and their applications", Weibo Liu, Zidong Wang, Xiaohui Liu, Nianyin Zeng, Yuong Liu, Fuad E. Aisaadi; in Neurocomputing Apr. 19, 2017 234: pp. 11-26.
"Investigatation on deep learning for off-line handwritten Arabic character recognition"; Bonfenar et a.; in Cognitive Systems Research Aug. 2018 50: pp. 180-195.
"Chinese Character CAPTCHA Recognition and performance estimation via deep neural network", Lin et. al.; Neurocomputing; May 2018, vol. 288, p. 11-19.
Building fast and compact convolutional neural networks for office handwritten Chinese character recognition, Xiao et al.; in Pattern Recognition Dec. 2017, pp. 72-81.
"Optical Character Recognition with Neural Network", Sarita; International Journal of Recent Research Aspects ISSN: 2349-7688, vol. 2 Issue 3, Sep. 2015, pp. 4-8.
"Improving handwritten Chinese text recognition using neural network language models and convolutional neural network shape

(56) References Cited

OTHER PUBLICATIONS models", Yi-Chao Wu; Fei Yin, Cheng-Lin Liu; in Pattern Recognition May 2017 65:pp. 251-264.

* cited by examiner

331

332

333

NATURAL LANGUAGE TRANSLATION DEVICE

FIELD

This patent document generally relates to the field of machine learning. More particularly the present document relates to natural language translation device using a Cellular Neural Networks or Cellular Nonlinear Networks (CNN) based Integrated Circuit embedded therein.

BACKGROUND

An ideogram is a graphic symbol that represents an idea or concept. Some ideograms are comprehensible only by familiarity with prior convention; others convey their meaning through pictorial resemblance to a physical object. Each ideogram can represent a word in a natural language including, but not limited to, a Chinese character, a Japanese character, a Korean character, an English word, etc.

Machine learning is an application of artificial intelligence. In machine learning, a computer or computing device is programmed to think like human beings so that the computer may be taught to learn on its own. The development of neural networks has been key to teaching computers to think and understand the world in the way human beings do. Many deep learning networks such as Cellular Neural Networks or Cellular Nonlinear Networks (CNN) have been developed in the past decade.

Natural language translations using a computer system have been around for a while. Prior art approaches predominantly rely on recurrent neural networks (RNN) to capture the semantic meaning of a piece of text before converting it from one natural language to another. RNN are complex and thereby difficult to implement in a semi-conductor chip. Accordingly, it would be desired to have improved methods and systems for translating natural language using a CNN based integrated circuit without RNN.

SUMMARY

This section is for the purpose of summarizing some aspects of the invention and to briefly introduce some preferred embodiments. Simplifications or omissions in this section as well as in the abstract and the title herein may be made to avoid obscuring the purpose of the section. Such simplifications or omissions are not intended to limit the scope of the invention.

The natural language translation apparatus are disclosed. According to one aspect of the disclosure, a natural language translation device contains a bus, an input interface connecting to the bus for receiving a source sentence in a first natural language to be translated to a target sentence in second natural language one word at a time in sequential order. A two-dimensional (2-D) symbol containing super-character characterizing the i-th word of the target sentence based on the received source sentence is formed in accordance with a set of 2-D symbol creation rules. The i-th word of the target sentence is obtained by classifying the 2-D symbol via a deep learning model that contains multiple ordered convolution layers in a Cellular Neural Networks or Cellular Nonlinear Networks (CNN) based integrated circuit.

According to another aspect of the disclosure, a digital integrated circuit contains cellular neural networks (CNN) processing engines operatively coupled to at least one input/output data bus. The CNN processing engines are connected in a loop with a clock-skew circuit. Each CNN processing engine includes a CNN processing block configured for simultaneously performing convolutional operations using input imagery data (2-D symbol) and pre-trained filter coefficients of the plurality of ordered convolutional layers. The first set of memory buffers operatively couples to the CNN processing block for storing the input imagery data. The second set of memory buffers operative couples to the CNN processing block for storing the pre-trained filter coefficients.

According to another aspect, a first example set of 2-D symbol creation rules contains the following actions: dividing the 2-D symbol into first and second parts; converting the source sentence to a first set of ideograms; converting the first word to the (i−1)-th word of the target sentence to a second set of ideograms; and forming the 2-D symbol by including the first set of ideograms in the first part and including the second set of ideograms in the second part.

According to yet another aspect, a second example set of 2-D symbol creation rules contains the following actions: converting the source sentence to a set of ideograms; dividing the 2-D symbol into a predetermined number of sub-symbols with each sub-symbol for one ideogram; and forming the 2-D symbol by including relevant portion of the set of ideograms in a scheme such that the ideogram corresponding to the i-th word is located in a predefined location, by filling each unoccupied sub-symbol with blank space if needed.

According to still another aspect, a third example set of 2-D symbol creation rules contains the following actions: dividing the 2-D symbol into a predetermined number of sub-symbols; creating the predetermined number of groups of consecutive words from the source sentence with each group encompassing the i-th word of the source sentence and said each group corresponding to one of the sub-symbols; and forming the 2-D symbol by including ideograms converted from respective groups of consecutive words for all sub-symbols.

Objects, features, and advantages of the invention will become apparent upon examining the following detailed description of an embodiment thereof, taken in conjunction with the attached drawings.

BRIEF DESCRIPTION OF THE DRAWINGS

These and other features, aspects, and advantages of the invention will be better understood with regard to the following description, appended claims, and accompanying drawings as follows:

DETAILED DESCRIPTIONS

In the following description, numerous specific details are set forth in order to provide a thorough understanding of the invention. However, it will become obvious to those skilled in the art that the invention may be practiced without these specific details. The descriptions and representations herein are the common means used by those experienced or skilled in the art to most effectively convey the substance of their work to others skilled in the art. In other instances, well-known methods, procedures, and components have not been described in detail to avoid unnecessarily obscuring aspects of the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Used herein, the terms "vertical", "horizontal", "diagonal", "left", "right", "upper", "lower", "top", "bottom", "column", "row", "diagonally" are intended to provide relative positions for the purposes of description, and are not intended to designate an absolute frame of reference. Additionally, used herein, term "character" and "script" are used interchangeably.

Embodiments of the invention are discussed herein with reference to FIGS. 1-22. However, those skilled in the art will readily appreciate that the detailed description given herein with respect to these figures is for explanatory purposes as the invention extends beyond these limited embodiments.

Figure 1:
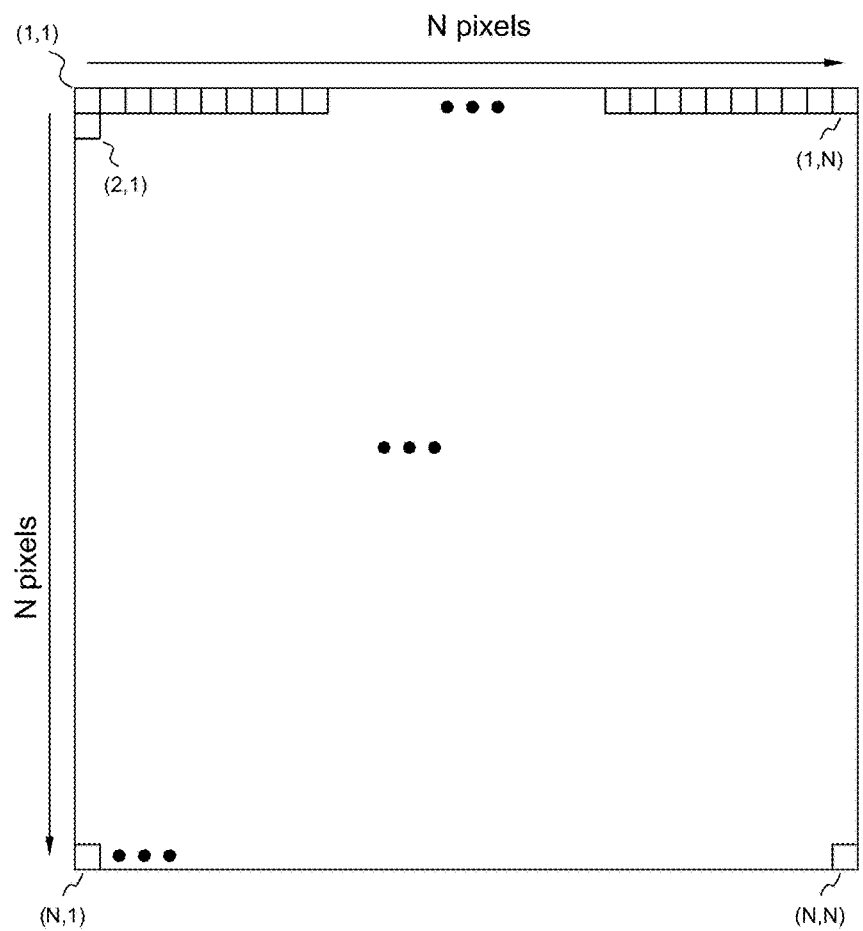
FIG. 1 is a diagram illustrating an example two-dimensional symbol comprising a matrix of N×N pixels of data that represents a super-character for facilitating machine learning of a combined meaning of multiple ideograms contained therein according to an embodiment of the invention.

Referring first to FIG. 1, it is shown a diagram showing an example two-dimensional symbol 100 for facilitating machine learning of a combined meaning of multiple ideograms contained therein. The two-dimensional symbol 100 comprises a matrix of N×N pixels (i.e., N columns by N rows) of data containing a super-character. Pixels are ordered with row first and column second as follows: (1,1), (1,2), (1,3), ... (1,N), (2,1), ... , (N,1), ... (N,N). N is a positive integer or whole number, for example in one embodiment, N is equal to 224.

super-character represents at least one meaning each formed with a specific combination of a plurality of ideograms. Since an ideogram can be represented in a certain size matrix of pixels, two-dimensional symbol 100 is divided into M×M sub-matrices. Each of the sub-matrices represents one ideogram, which is defined in an ideogram collection set by humans. super-character contains a minimum of two and a maximum of M×M ideograms. Both N and M are positive integers or whole numbers, and N is preferably a multiple of M.

Figure 2A:
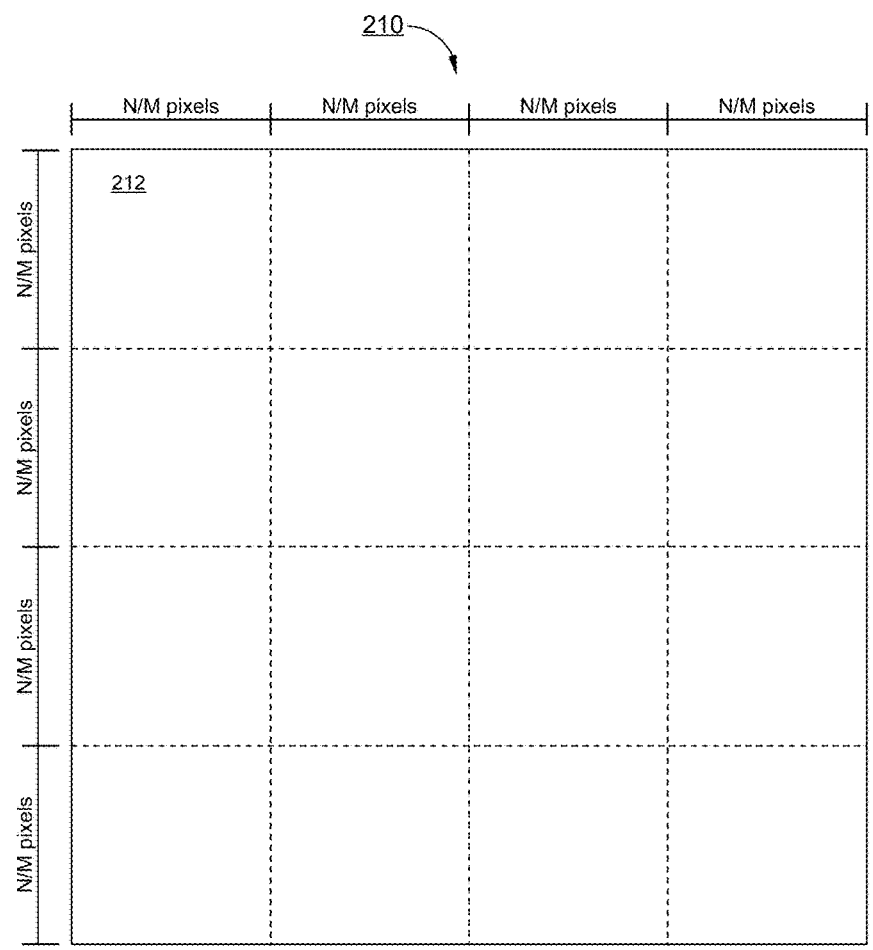
FIGS. 2A-2B are diagrams showing example partition schemes for dividing the two-dimensional symbol of FIG. 1 in accordance with embodiments of the invention.

Shown in FIG. 2A, it is a first example partition scheme 210 of dividing a two-dimension symbol into M×M sub-matrices 212. M is equal to 4 in the first example partition scheme. Each of the M×M sub-matrices 212 contains (N/M)×(N/M) pixels. When N is equal to 224, each sub-matrix contains 56×56 pixels and there are 16 sub-matrices.

Figure 2B:
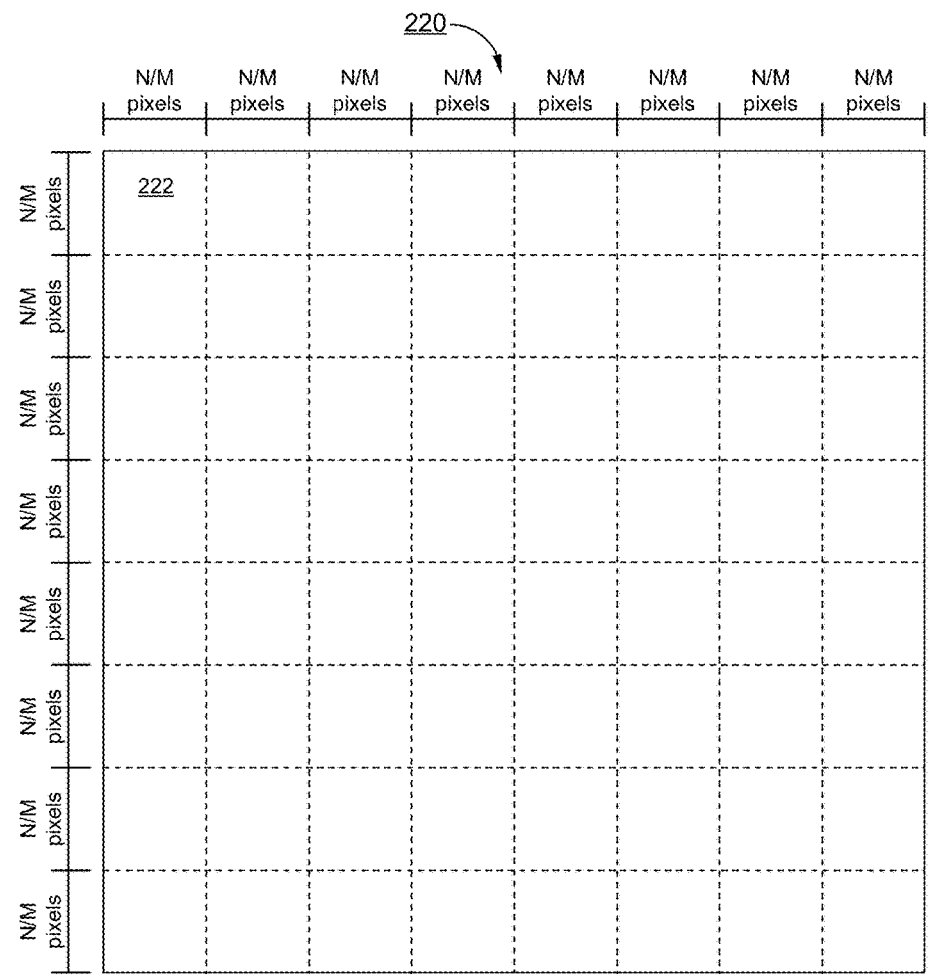

A second example partition scheme 220 of dividing a two-dimension symbol into M×M sub-matrices 222 is shown in FIG. 2B. M is equal to 8 in the second example partition scheme. Each of the M×M sub-matrices 222 contains (N/M)×(N/M) pixels. When N is equal to 224, each sub-matrix contains 28×28 pixels and there are 64 sub-matrices.

Figure 3A:
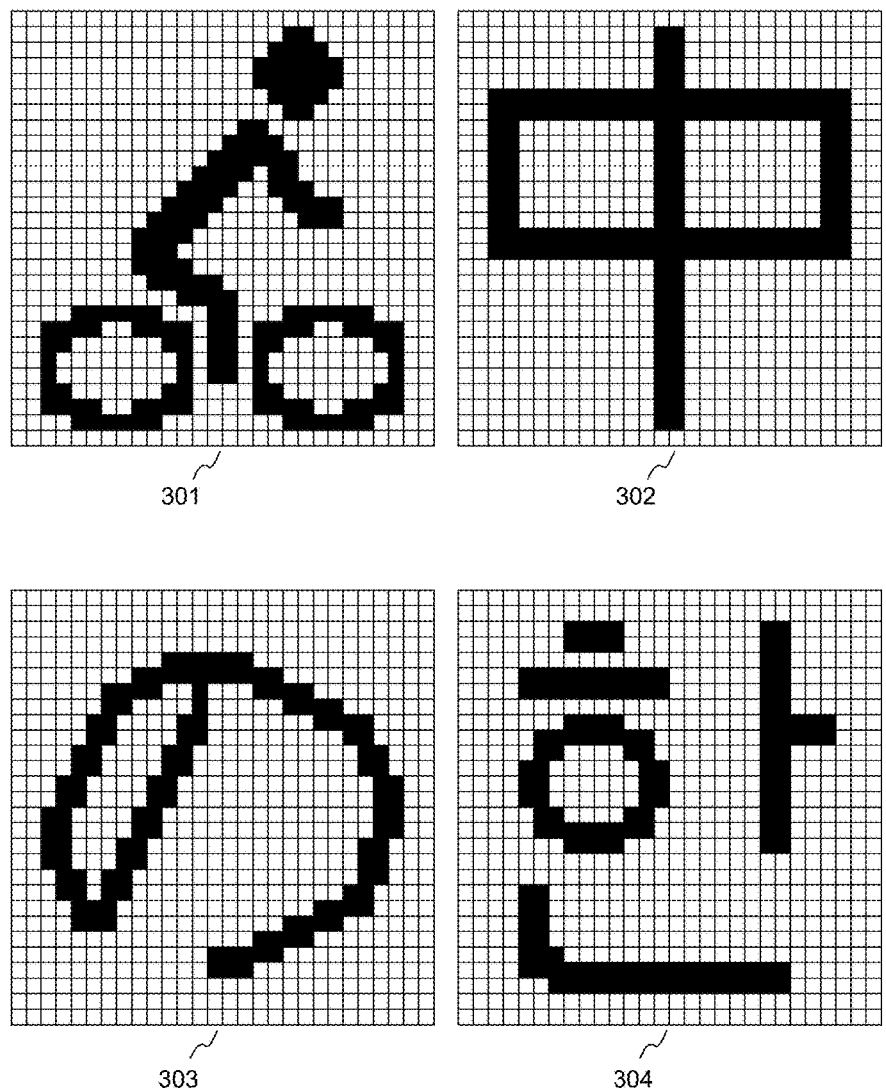
FIGS. 3A-3B show example ideograms in accordance with an embodiment of the invention.

FIG. 3A shows example ideograms 301-304 that can be represented in a sub-matrix 222 (i.e., 28×28 pixels). For those having ordinary skill in the art would understand that the sub-matrix 212 having 56×56 pixels can also be adapted for representing these ideograms. The first example ideogram 301 is a pictogram representing an icon of a person riding a bicycle. The second example ideogram 302 is a logosyllabic script or character representing an example Chinese character. The third example ideogram 303 is a logosyllabic script or character representing an example Japanese character and the fourth example ideogram 304 is a logosyllabic script or character representing an example Korean character. Additionally, ideogram can also be punctuation marks, numerals or special characters. In another embodiment, pictogram may contain an icon of other images. Icon used herein in this document is defined by humans as a sign or representation that stands for its object by virtue of a resemblance or analogy to it.

Figure 3B:
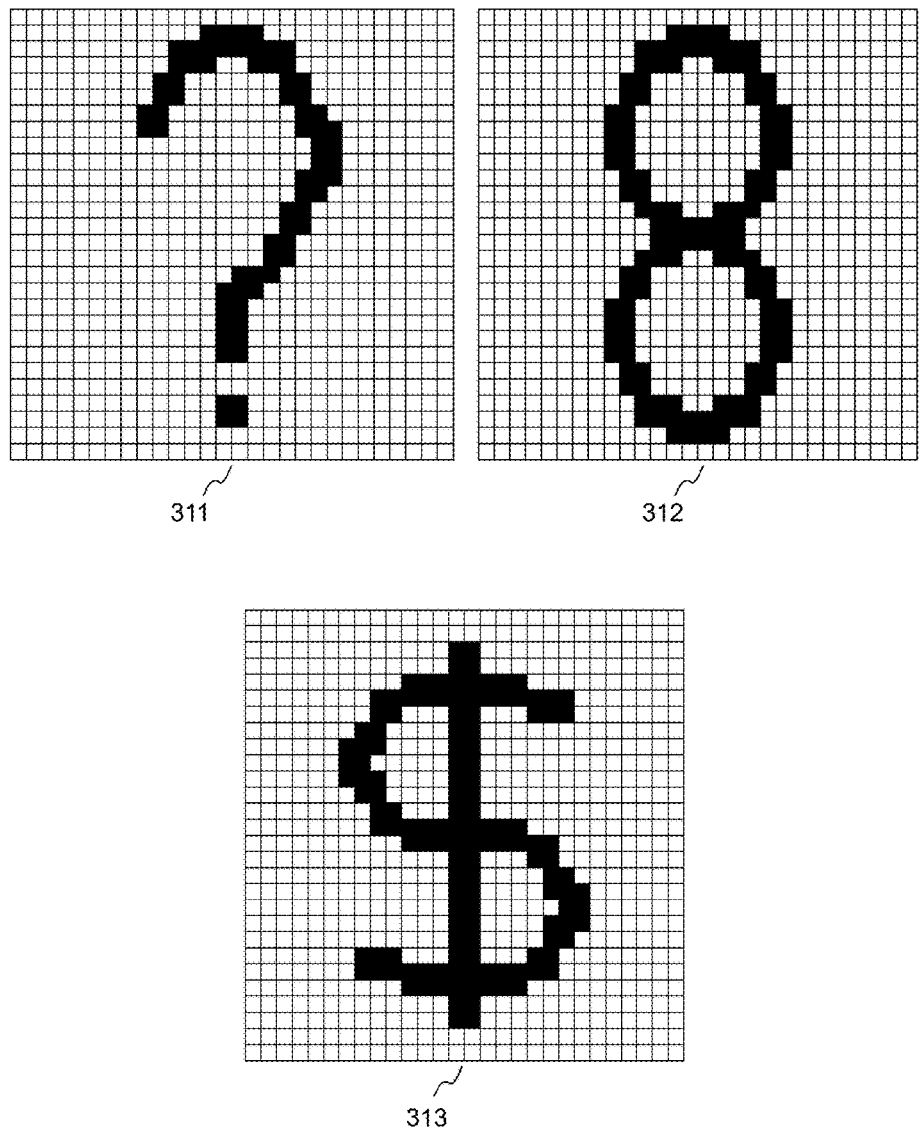
Figure 3C:
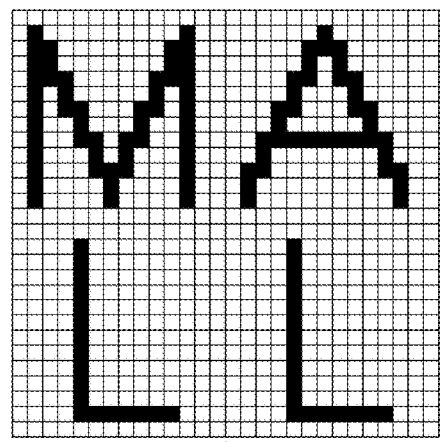
FIG. 3C shows example pictograms containing western languages based on Latin letters in accordance with an embodiment of the invention.
Figure 3C:
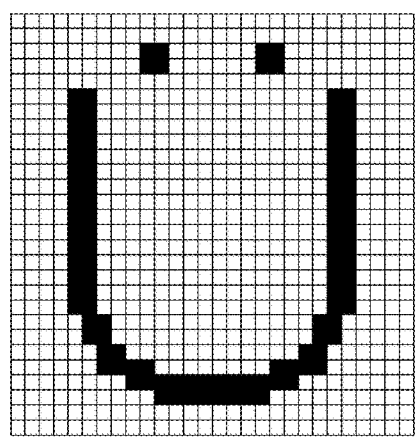
Figure 3C:
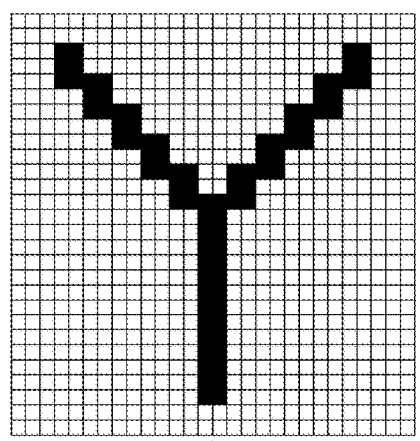

FIG. 3B shows several example ideograms representing: a punctuation mark 311, a numeral 312 and a special character 313. Furthermore, pictogram may contain one or more words of western languages based on Latin letters, for example, English, Spanish, French, German, etc. FIG. 3C shows example pictograms containing western languages based on Latin letters. The first example pictogram 326 shows an English word "MALL". The second example pictogram 327 shows a Latin letter "Ü" and the third example pictogram 328 shows English alphabet "Y". Ideogram can be any one of them, as long as the ideogram is defined in the ideogram collection set by humans.

Only limited number of features of an ideogram can be represented using one single two-dimensional symbol. For example, features of an ideogram can be black and white when data of each pixel contains one-bit. Feature such as grayscale shades can be shown with data in each pixel containing more than one-bit.

Additional features are represented using two or more layers of an ideogram. In one embodiment, three respective basic color layers of an ideogram (i.e., red, green and blue) are used collectively for representing different colors in the ideogram. Data in each pixel of the two-dimensional symbol contains a K-bit binary number. K is a positive integer or whole number. In one embodiment, K is 5.

Figure 3D:
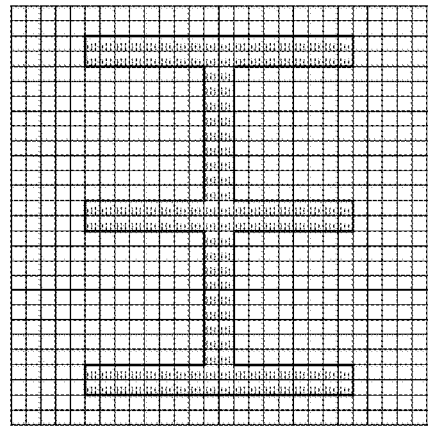
FIG. 3D shows three respective basic color layers of an example ideogram in accordance with an embodiment of the invention.
Figure 3D:
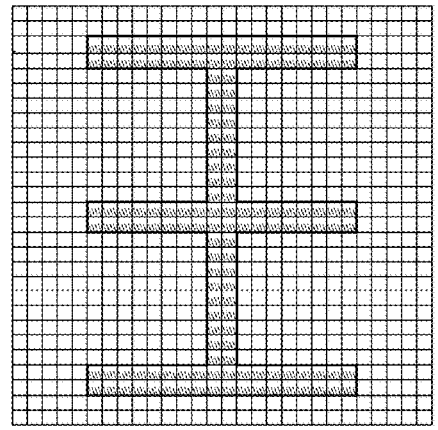
Figure 3D:
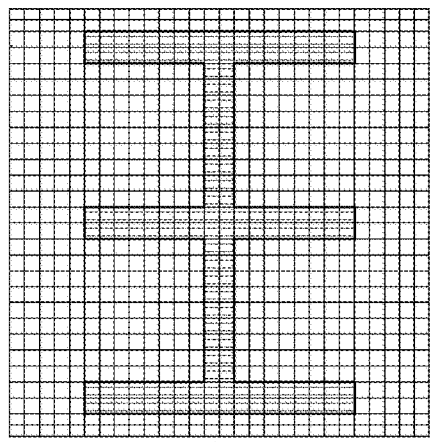

FIG. 3D shows three respective basic color layers of an example ideogram. Ideogram of a Chinese character are shown with red 331, green 332 and blue 333. With different combined intensity of the three basic colors, a number of color shades can be represented. Multiple color shades may exist within an ideogram.

Figure 3E:
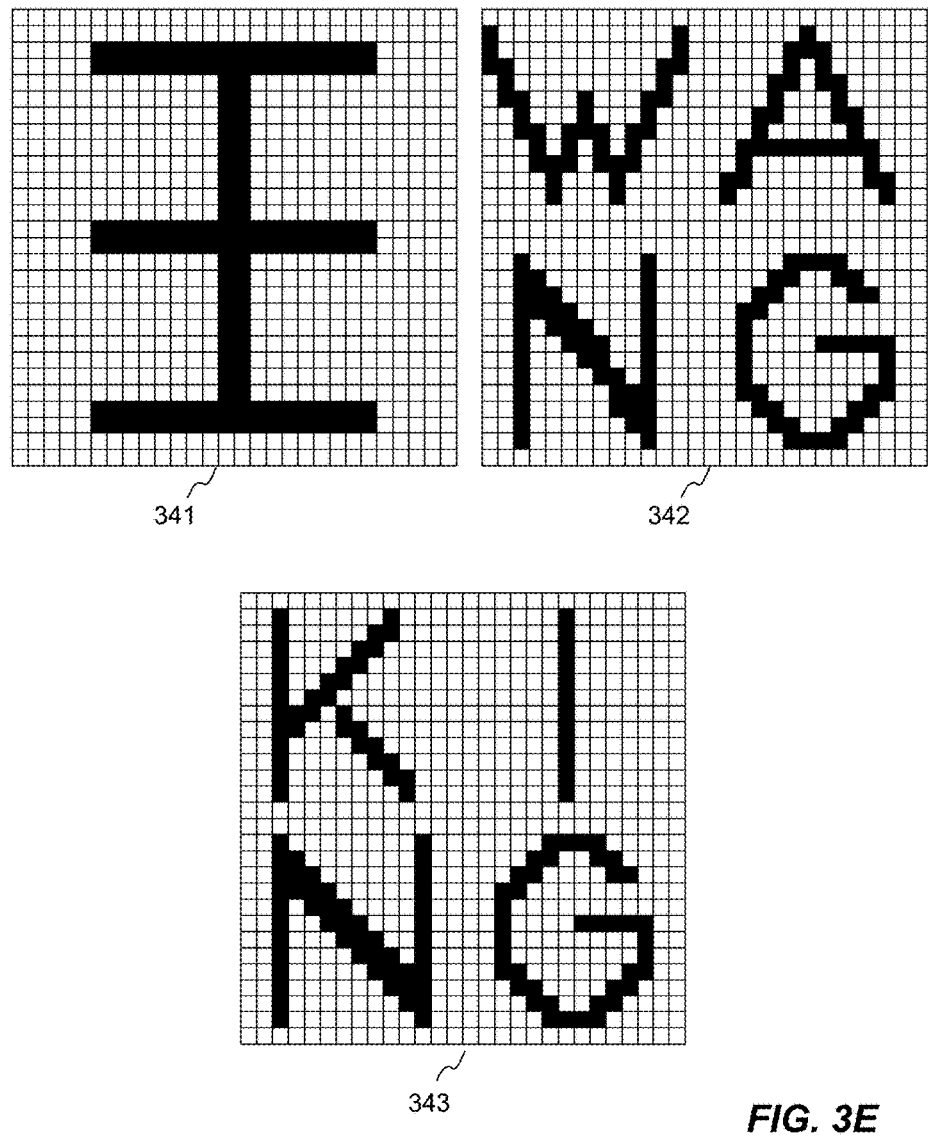
FIG. 3E shows three related layers of an example ideogram for dictionary-like definition in accordance with an embodiment of the invention.

In another embodiment, three related ideograms are used for representing other features such as a dictionary-like definition of a Chinese character shown in FIG. 3E. There are three layers for the example ideogram in FIG. 3E: the first layer 341 showing a Chinese logosyllabic character, the second layer 342 showing the Chinese "pinyin" pronunciation as "wang", and the third layer 343 showing the meaning in English as "king".

Ideogram collection set includes, but is not limited to, pictograms, icons, logos, logosyllabic characters, punctuation marks, numerals, special characters. Logosyllabic characters may contain one or more of Chinese characters, Japanese characters, Korean characters, etc.

In order to systematically include Chinese characters, a standard Chinese character set (e.g., GB18030) may be used as a start for the ideogram collection set. For including Japanese and Korean characters, CJK Unified Ideographs may be used. Other character sets for logosyllabic characters or scripts may also be used.

A specific combined meaning of ideograms contained in a super-character is a result of using image processing techniques in a Cellular Neural Networks or Cellular Non-linear Networks (CNN) based computing system. Image processing techniques include, but are not limited to, convolutional neural networks, recurrent neural networks, etc.

super-character represents a combined meaning of at least two ideograms out of a maximum of M×M ideograms. In one embodiment, a pictogram and a Chinese character are combined to form a specific meaning. In another embodiment, two or more Chinese characters are combined to form a meaning. In yet another embodiment, one Chinese character and a Korean character are combined to form a meaning. There is no restriction as to which two or more ideograms to be combined.

Ideograms contained in a two-dimensional symbol for forming super-character can be arbitrarily located. No specific order within the two-dimensional symbol is required. Ideograms can be arranged left to right, right to left, top to bottom, bottom to top, or diagonally.

Using written Chinese language as an example, combining two or more Chinese characters may result in a super-character including, but not limited to, phrases, idioms, proverbs, poems, sentences, paragraphs, written passages, articles (i.e., written works). In certain instances, the super-character may be in a particular area of the written Chinese language. The particular area may include, but is not limited to, certain folk stories, historic periods, specific background, etc.

Figure 4A:
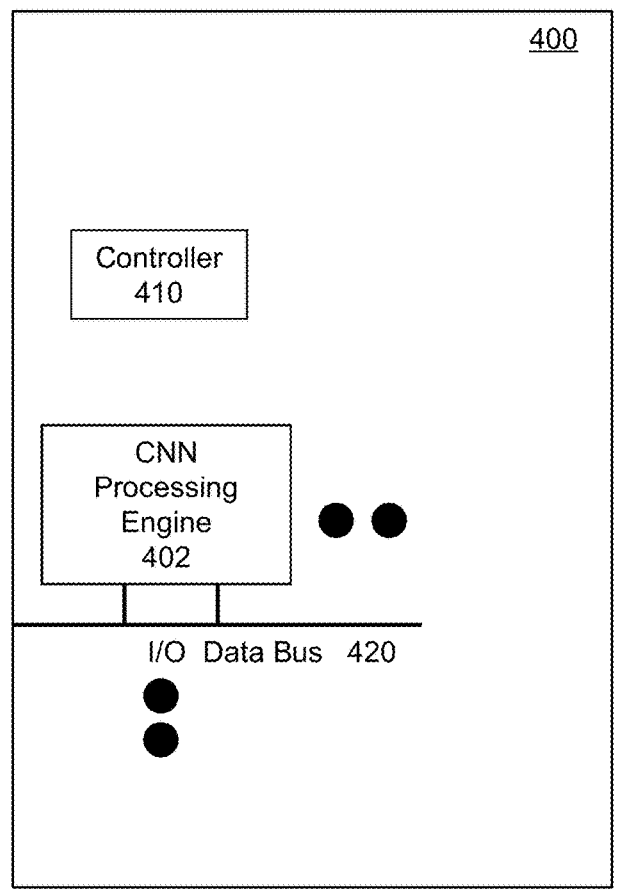
FIG. 4A is a block diagram illustrating an example Cellular Neural Networks or Cellular Nonlinear Networks (CNN) based computing system for machine learning of a combined meaning of multiple ideograms contained in a two-dimensional symbol, according to one embodiment of the invention.

Referring now to FIG. 4A, it is shown a block diagram illustrating an example CNN based computing system 400 configured for machine learning of a combined meaning of multiple ideograms contained in a two-dimensional symbol (e.g., the two-dimensional symbol 100).

The CNN based computing system 400 may be implemented on integrated circuits as a digital semi-conductor chip (e.g., a silicon substrate) and contains a controller 410, and a plurality of CNN processing units 402a-402b operatively coupled to at least one input/output (I/O) data bus 420. Controller 410 is configured to control various operations of the CNN processing units 402a-402b, which are connected in a loop with a clock-skew circuit.

In one embodiment, each of the CNN processing units 402a-402b is configured for processing imagery data, for example, two-dimensional symbol 100 of FIG. 1.

To store an ideogram collection set, one or more storage units operatively coupled to the CNN based computing system 400 are required. Storage units (not shown) can be located either inside or outside the CNN based computing system 400 based on well known techniques.

Super-character may contain more than one meanings in certain instances. super-character can tolerate certain errors that can be corrected with error-correction techniques. In other words, the pixels represent ideograms do not have to be exact. The errors may have different causes, for example, data corruptions, during data retrieval, etc.

Figure 4B:
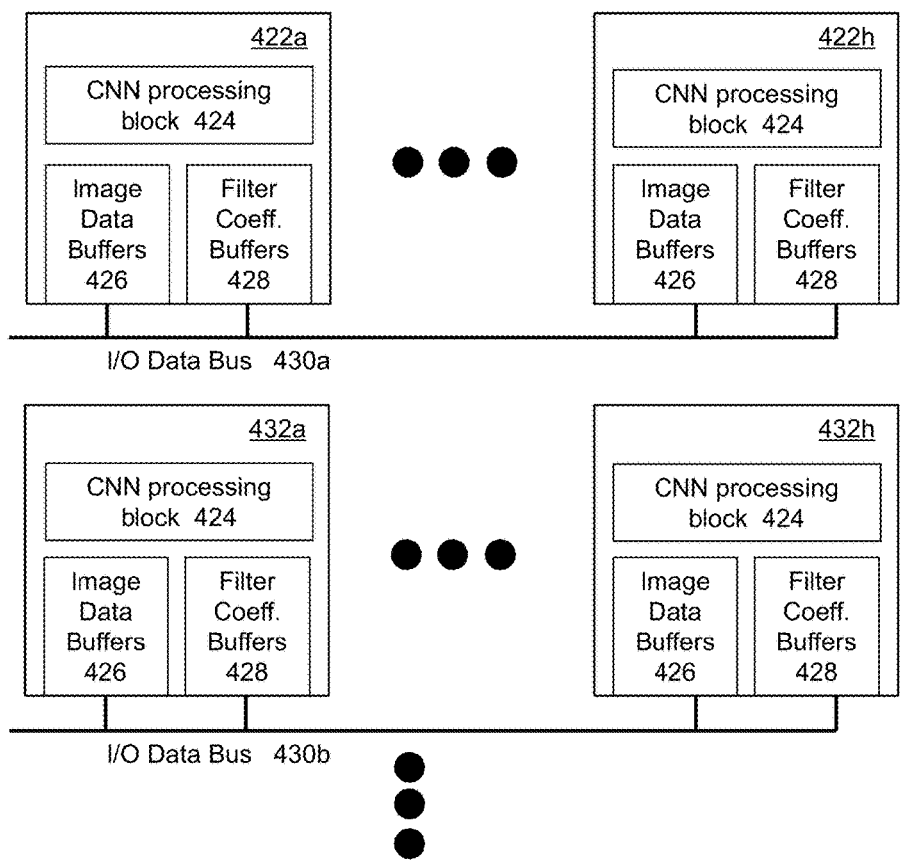
FIG. 4B is a block diagram illustrating an example CNN based integrated circuit for performing image processing based on convolutional neural networks, according to one embodiment of the invention.

In another embodiment, the CNN based computing system is a digital integrated circuit that can be extendable and scalable. For example, multiple copies of the digital integrated circuit may be implemented on a single semi-conductor chip as shown in FIG. 4B.

All of the CNN processing engines are identical. For illustration simplicity, only few (i.e., CNN processing engines 422a-422h, 432a-432h) are shown in FIG. 4B. There is no limit as to the number of CNN processing engines on a digital semi-conductor chip.

Each CNN processing engine 422a-422h, 432a-432h contains a CNN processing block 424, a first set of memory buffers 426 and a second set of memory buffers 428. The first set of memory buffers 426 is configured for receiving imagery data and for supplying the already received imagery data to the CNN processing block 424. The second set of memory buffers 428 is configured for storing filter coefficients and for supplying the already received filter coefficients to the CNN processing block 424. In general, the number of CNN processing engines on a chip is $2^n$, where n is an integer (i.e., 0, 1, 2, 3, . . . ). As shown in FIG. 4B, CNN processing engines 422a-422h are operatively coupled to a first input/output data bus 430a while CNN processing engines 432a-432h are operatively coupled to a second input/output data bus 430b. Each input/output data bus 430a-430b is configured for independently transmitting data (i.e., imagery data and filter coefficients). In one embodiment, the first and the second sets of memory buffers comprise random access memory (RAM), which can be a combination of one or more types, for example, Magnetic Random Access Memory, Static Random Access Memory, etc. Each of the first and the second sets are logically defined. In other words, respective sizes of the first and the second sets can be reconfigured to accommodate respective amounts of imagery data and filter coefficients.

The first and the second I/O data bus 430a-430b are shown here to connect the CNN processing engines 422a-422h, 432a-432h in a sequential scheme. In another embodiment, the at least one I/O data bus may have different connection scheme to the CNN processing engines to accomplish the same purpose of parallel data input and output for improving performance.

Figure 5:
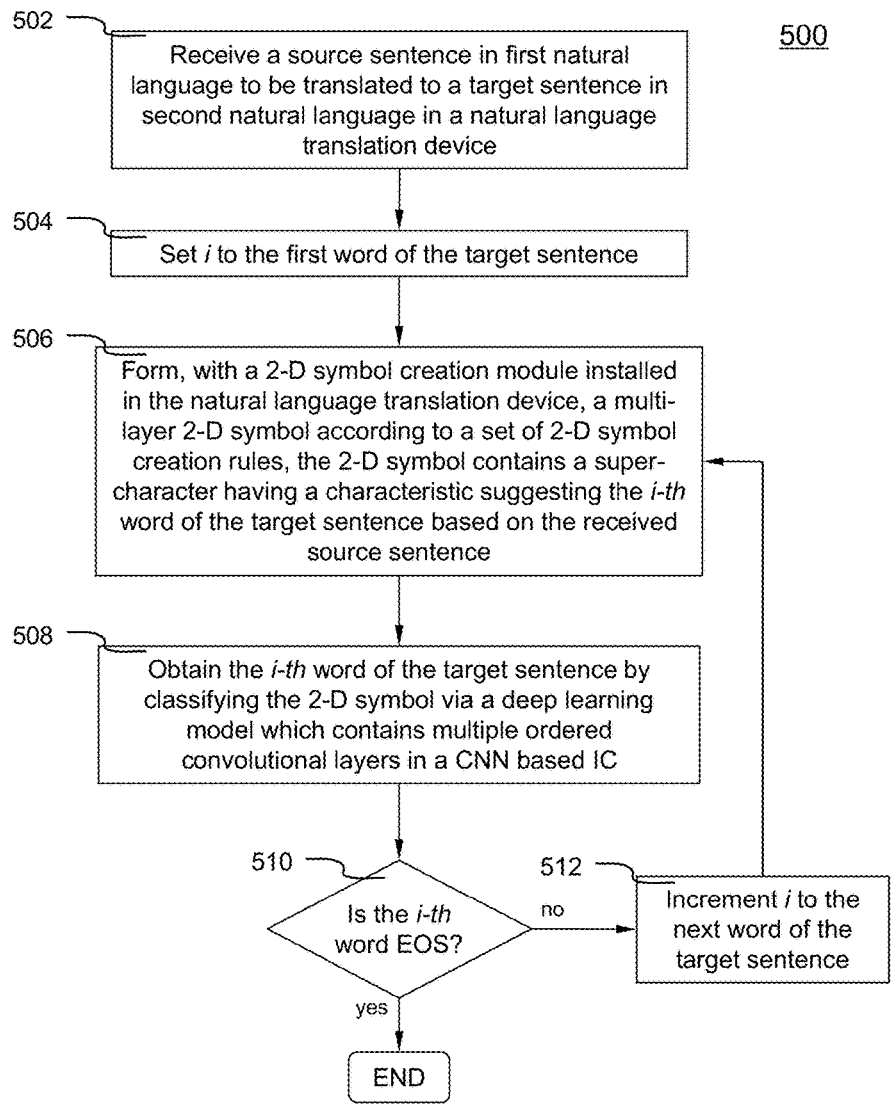
FIG. 5 is a flowchart illustrating an example process of natural language translation using a CNN based integrated circuit in accordance with an embodiment of the invention.

FIG. 5 is a flowchart illustrating an example process 500 of natural languages translation using a CNN based integrated circuit 400. Process 500 can be implemented in software as an application module installed in at least one computer system. Process 500 may also be implemented in hardware (e.g., integrated circuits).

Process 500 starts at action 502 by receiving a source sentence or phrase in a first natural language to be translated to a target sentence phrase in a second natural language one word at a time in sequential order. The source sentence is received via an input interface of a natural language translation device (e.g., example natural language translation devices 2100-2200). Next, at action 504, an index "i" is set or initialized to the beginning of the target sentence. The index "i" is used for indicating which word of the target sentence is currently being translated. Terms 'sentence' and 'phrase' are used interchangeably in this disclosure.

Figure 16:
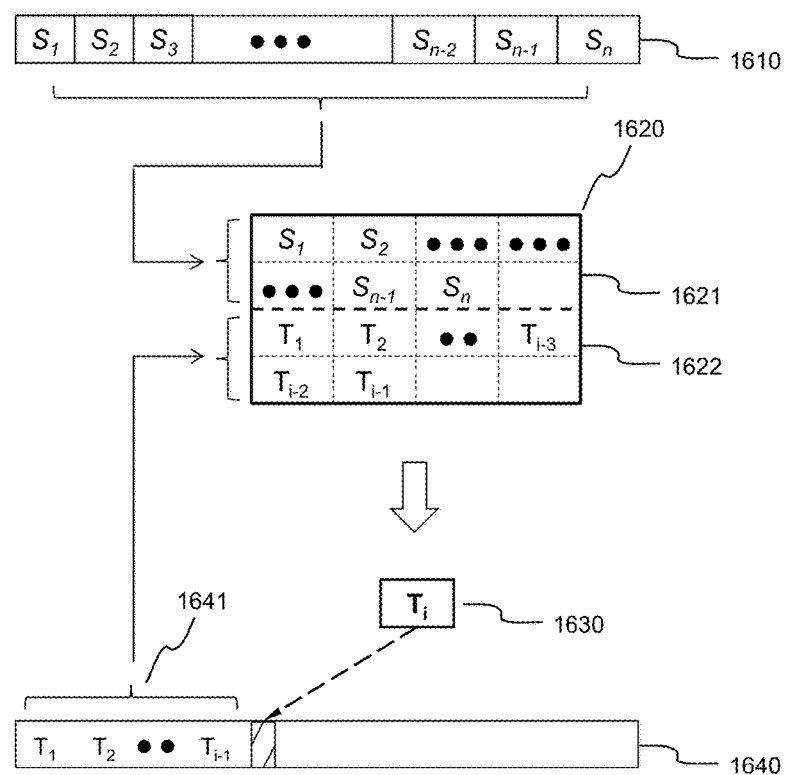
FIG. 16 is a schematic diagram showing a first example two-dimensional symbol used for natural language translation in accordance with an embodiment of the invention.
Figure 17:
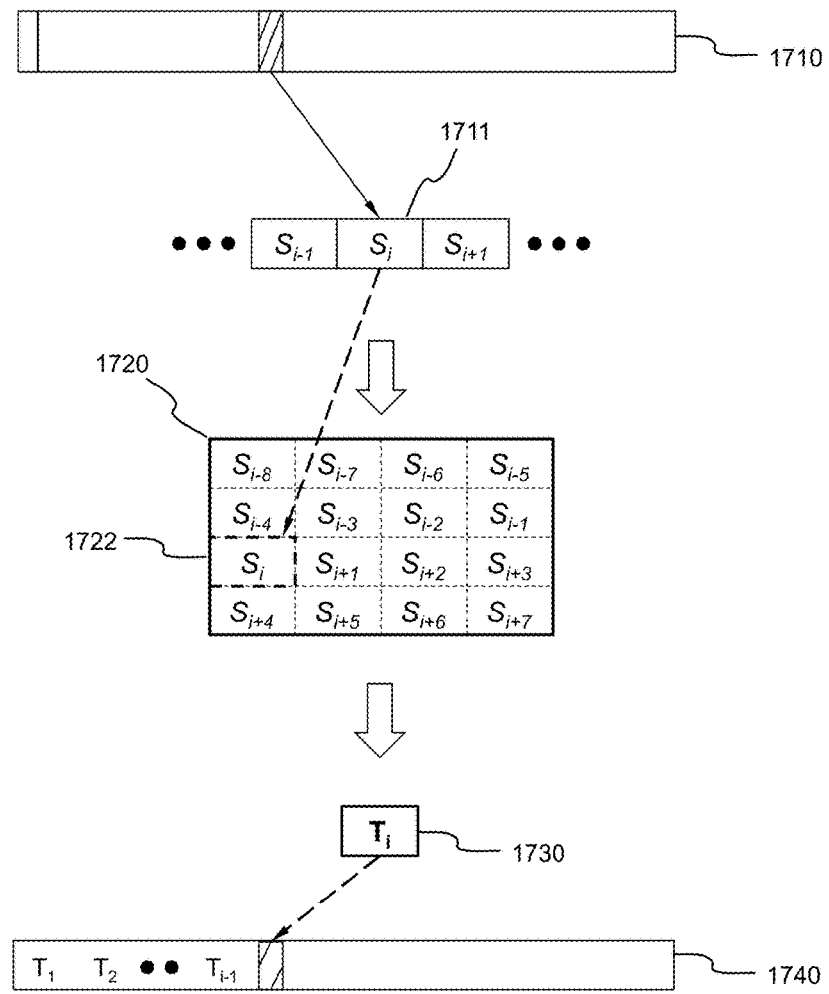
FIG. 17 is a schematic diagram showing a second example two-dimensional symbol used for natural language translation in accordance with an embodiment of the invention.
Figure 18:
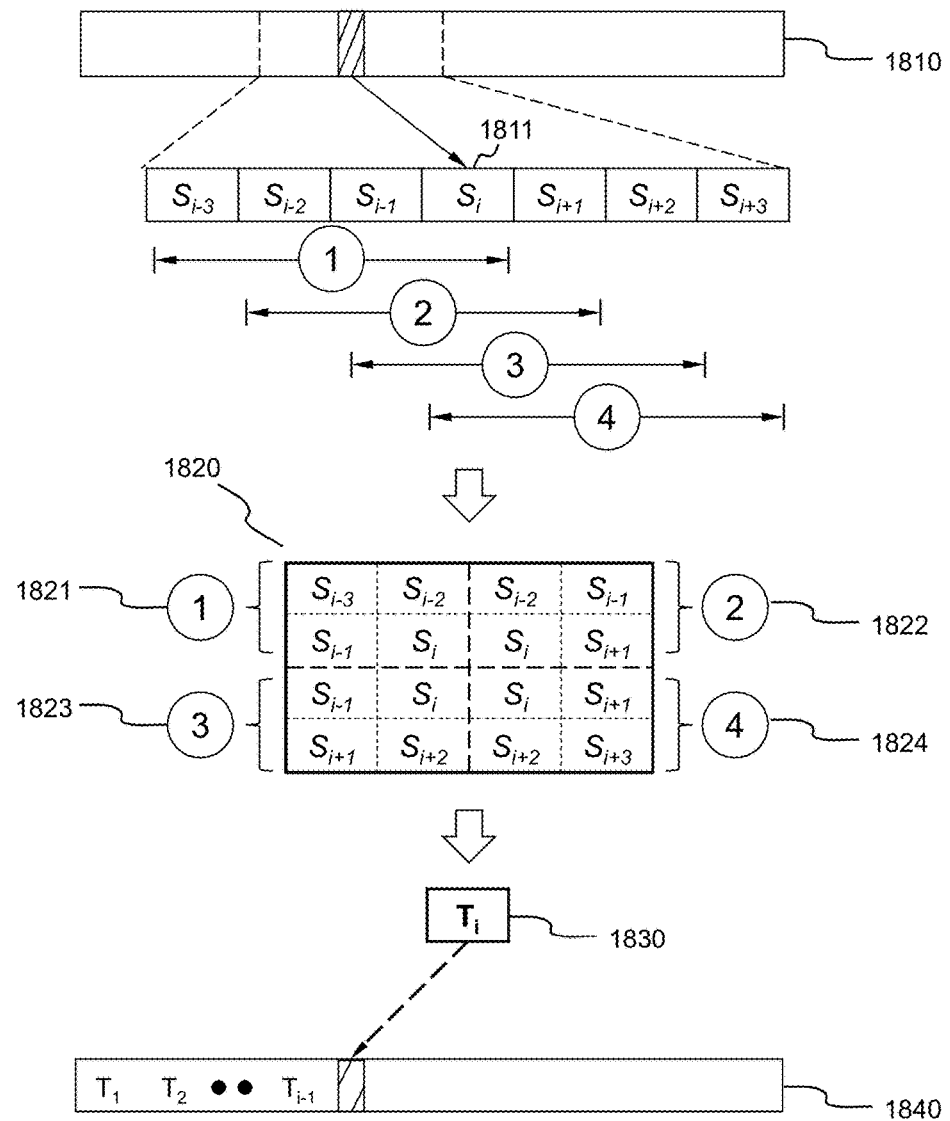
FIG. 18 is a schematic diagram showing a third example two-dimensional symbol used for natural language translation in accordance with an embodiment of the invention.

Then, at action 506, a multi-layer two-dimensional (2-D) symbol is formed according to a set of 2-D symbol creation rules using a 2-D symbol creation module installed on the natural language translation device. The 2-D symbol contains a super-character having a characteristic suggesting the i-th word of the target sentence based on the received source sentence. Example 2-D symbols are shown in FIGS. 16-18 and corresponding descriptions for the 2-D symbol creation rules.

At action 508, the i-th word of the target sentence is obtained by classifying the 2-D symbol via a deep learning model that contains multiple ordered convolutional layers in a CNN based integrated circuit.

Next, at decision 510, it is determined whether the obtained i-th word is an end-of-sentence (EOS) marker. The end of a target sentence includes such a marker to indicate the termination of a sentence. If not, process 500 following the 'no' branch to action 512. The index "i" is incremented to the next word of the target sentence. Then process 500 repeats actions 506-508 until decision 510 becomes true. Process 500 ends thereafter.

Figure 6:
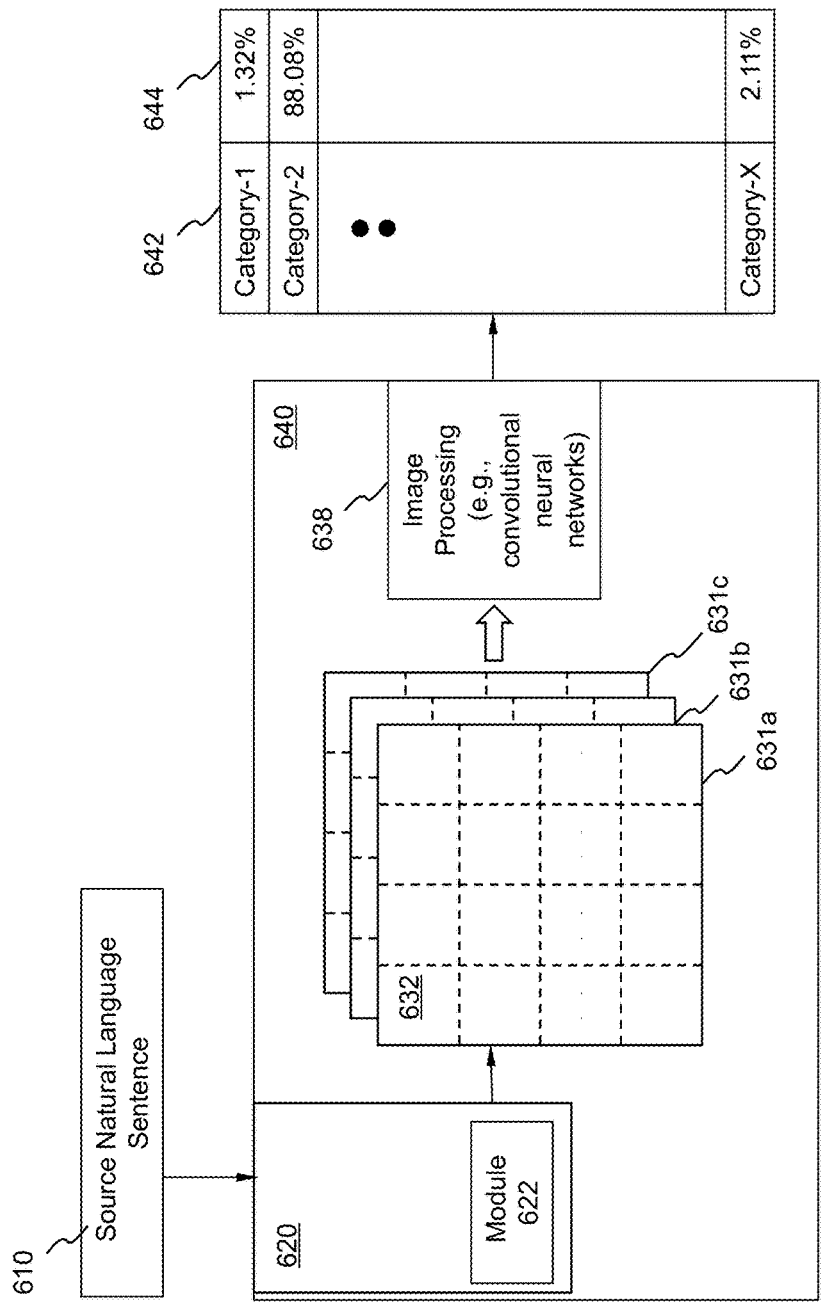
FIG. 6 is a schematic diagram showing dataflow of an example natural language translation device in accordance with an embodiment of the invention.
Figure 21:
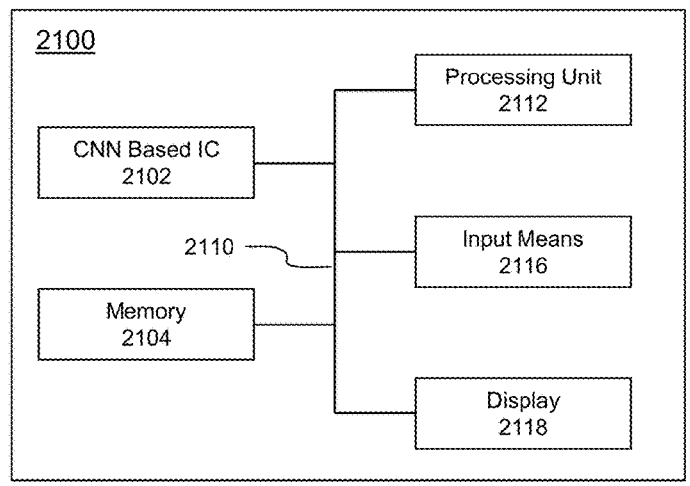
FIG. 21 is a function diagram showing a first example natural language translation device in accordance with one embodiment of the invention.
Figure 22:
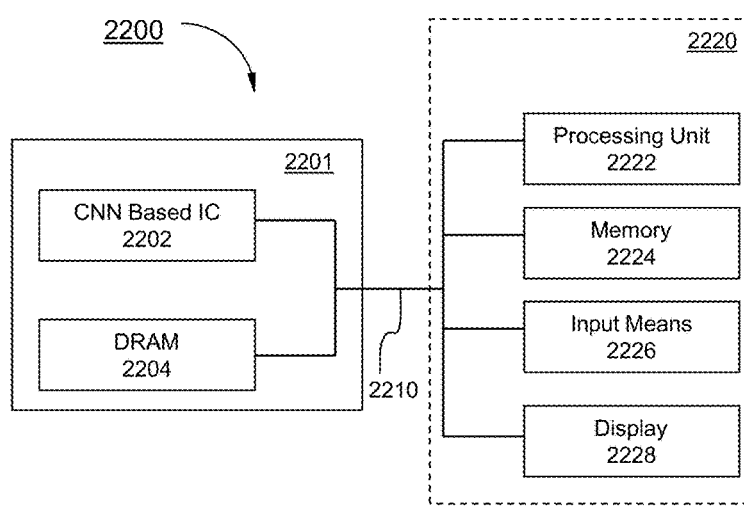
FIG. 22 is a function diagram showing a second example natural language translation device in accordance with one embodiment of the invention.

FIG. 6 is a schematic diagram showing dataflow of an example natural language translation device (e.g., devices 2100-2200 shown in FIGS. 21-22). A source sentence in first natural language 610 is received via an input interface (not shown) operatively coupled to processing unit 620. The source sentence 610 is to be translated to a target sentence in a second natural language one word at a time in sequential order.

Figure 7:
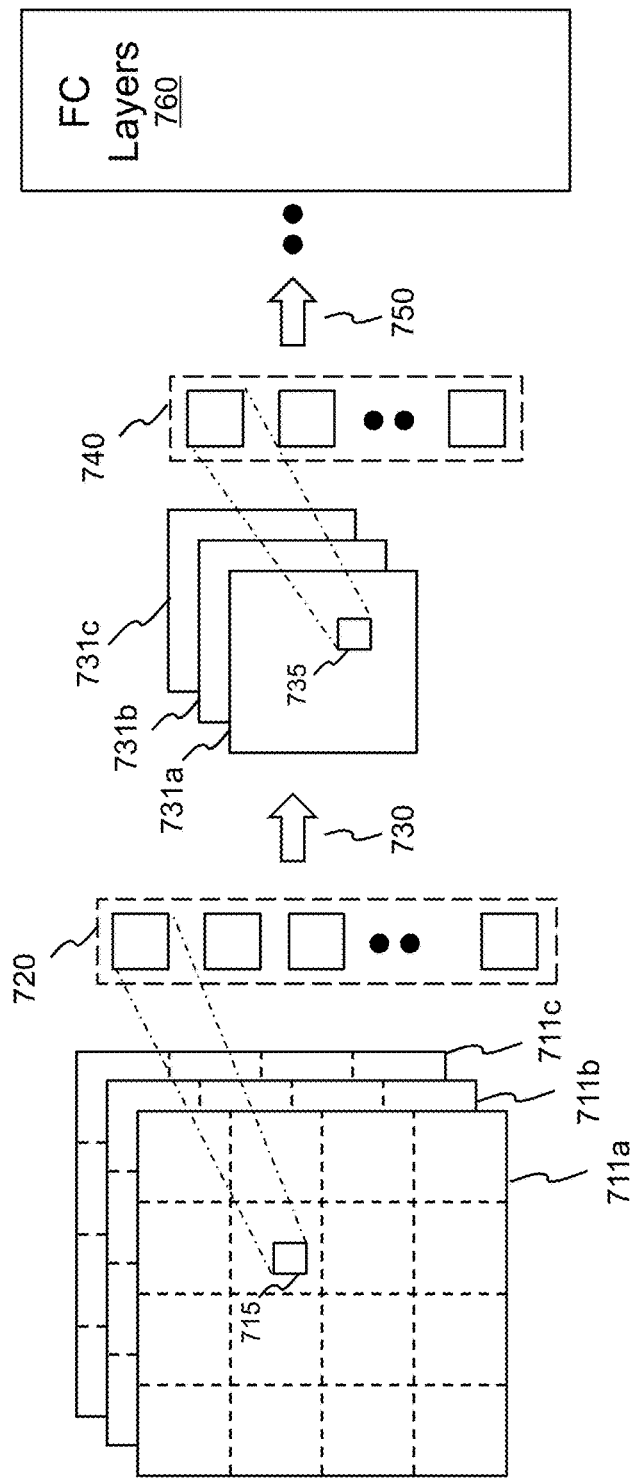
FIG. 7 is a schematic diagram showing an example image processing technique based on convolutional neural networks in accordance with an embodiment of the invention.

Using a 2-D symbol creation module 622 installed thereon, processing unit 620 forms a 2-D symbol 631a-631c (i.e., an image contained in a matrix of N×N pixels of data in multiple layers) containing M×M ideograms 632 (e.g., two-dimensional symbol 100 of FIG. 1) in accordance with a set of 2-D symbol creation rules derived from the received source sentence 610. Each two-dimensional symbol 631a-631c is a matrix of N×N pixels of data containing a super-character. The matrix is divided into M×M sub-matrices representing respective M×M ideograms. Super-character represents a characteristic suggesting the i-th word of the target sentence. M and N are positive integers or whole numbers, and N is preferably a multiple of M. More details of forming the multi-layer two-dimensional symbol are shown in FIG. 7 and corresponding descriptions.

The i-th word is obtained by classifying the multi-layer two-dimensional symbol 631a-631c via a deep learning model (e.g., image processing technique 638 using convolutional neural networks) in CNN based integrated circuits implemented on a semi-conductor chip shown in FIG. 4A.

The image processing technique 638 includes predefining a set of categories 642 (e.g., "Category-1", "Category-2", . . . "Category-X" shown in FIG. 6). As a result of performing the image processing technique 638, respective probabilities 644 of the categories are determined for associating each of the predefined categories 642 with the meaning/characteristic of the super-character. In the example shown in FIG. 6, the highest probability of 88.08 percent is shown for "Category-2". In other words, the multi-layer two-dimensional symbol 631a-631c contains a super-character whose characteristic (i.e., the i-th word of the target sentence) has a probability of 88.08 percent associated with "Category-2" amongst all the predefined categories 644.

In one embodiment, the multi-layer two-dimensional symbol 631a-631c contains three layers for red, green and blue hues. Each pixel in each layer of the two-dimension symbol contains K-bit. In one embodiment, K=8 for supporting true color, which contains 256 shades of red, green and blue. In another embodiment, K=5 for a reduced color map having 32 shades of red, green and blue.

FIG. 7 is a schematic diagram showing an example image processing technique based on convolutional neural networks.

Based on convolutional neural networks, a multi-layer two-dimensional symbol 711a-711c as input imagery data is processed with convolutions using a first set of filters or weights 720. Since the imagery data of the 2-D symbol 711a-711c is larger than the filters 720. Each corresponding overlapped sub-region 715 of the imagery data is processed.

After the convolutional results are obtained, activation may be conducted before a first pooling operation 730. In one embodiment, activation is achieved with rectification performed in a rectified linear unit (ReLU). As a result of the first pooling operation 730, the imagery data is reduced to a reduced set of imagery data 731a-731c. For 2×2 pooling, the reduced set of imagery data is reduced by a factor of 4 from the previous set.

The previous convolution-to-pooling procedure is repeated. The reduced set of imagery data 731a-731c is then processed with convolutions using a second set of filters 740. Similarly, each overlapped sub-region 735 is processed. Another activation can be conducted before a second pooling operation 740. The convolution-to-pooling procedures are repeated for several layers and finally connected to a Fully-Connected Layers 760. In image classification, respective probabilities 644 of predefined categories 642 can be computed in Fully-Connected Layers 760.

This repeated convolution-to-pooling procedure is trained using a known dataset or database. For image classification, the dataset contains the predefined categories. A particular set of filters, activation and pooling can be tuned and obtained before use for classifying an imagery data, for example, a specific combination of filter types, number of filters, order of filters, pooling types, and/or when to perform activation. In one embodiment, the imagery data is the multi-layer two-dimensional symbol 711a-711c, which is form from a string of natural language texts.

In one embodiment, convolutional neural networks are based on a Visual Geometry Group (VGG16) architecture neural nets.

Figure 8:
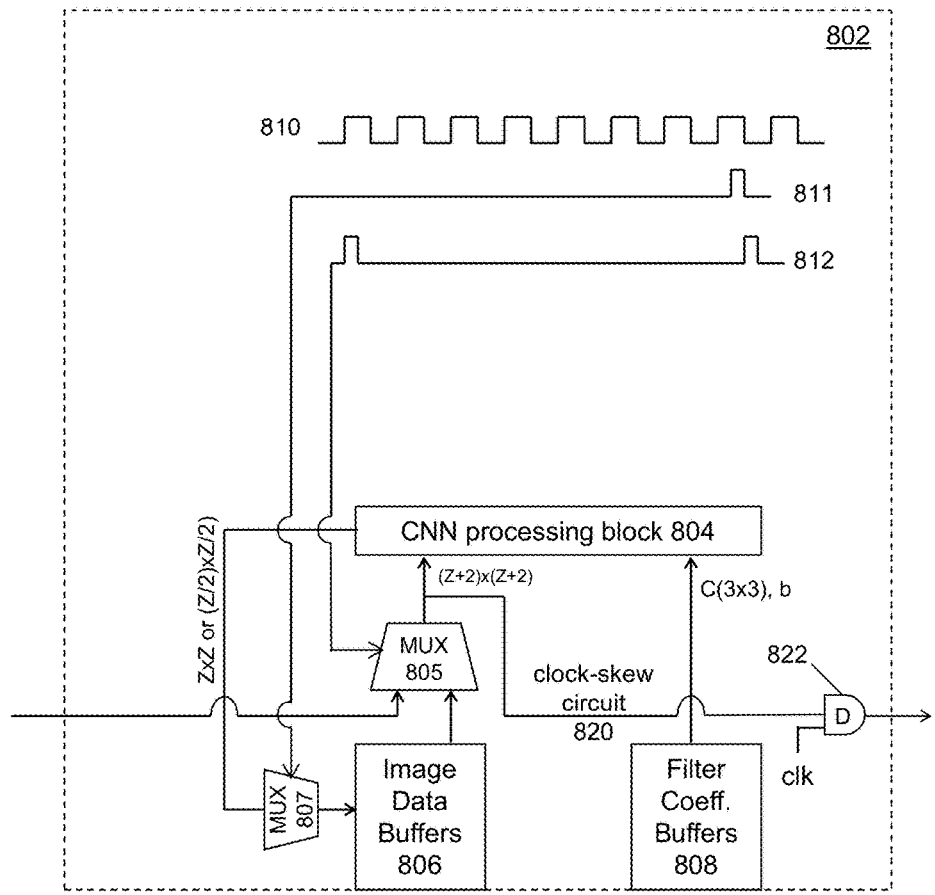
FIG. 8 is a diagram showing an example CNN processing engine in a CNN based integrated circuit, according to one embodiment of the invention.

More details of a CNN processing engine 802 in a CNN based integrated circuit are shown in FIG. 8. A CNN processing block 804 contains digital circuitry that simultaneously obtains Z×Z convolution operations results by performing 3×3 convolutions at Z×Z pixel locations using imagery data of a (Z+2)-pixel by (Z+2)-pixel region and corresponding filter coefficients from the respective memory buffers. The (Z+2)-pixel by (Z+2)-pixel region is formed with the Z×Z pixel locations as an Z-pixel by Z-pixel central portion plus a one-pixel border surrounding the central portion. Z is a positive integer. In one embodiment, Z equals to 14 and therefore, (Z+2) equals to 16, Z×Z equals to 14×14=196, and Z/2 equals 7.

Figure 9:
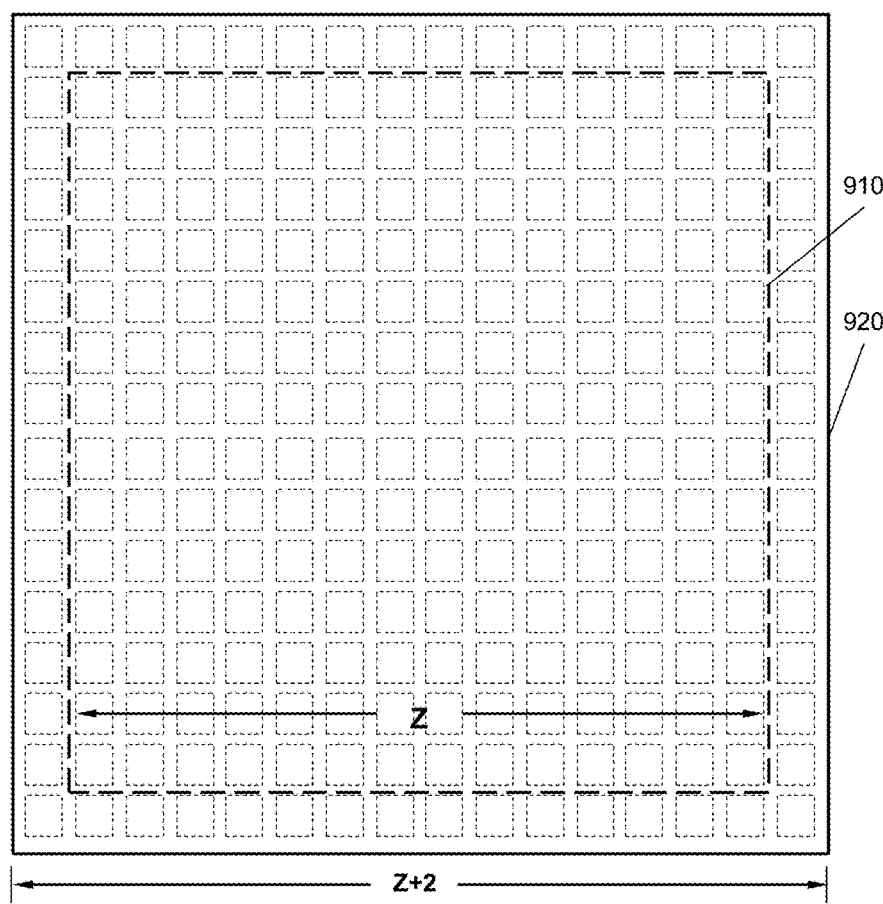
FIG. 9 is a diagram showing an example imagery data region within the example CNN processing engine of FIG. 8, according to an embodiment of the invention.

FIG. 9 is a diagram showing a diagram representing (Z+2)-pixel by (Z+2)-pixel region 910 with a central portion of Z×Z pixel locations 920 used in the CNN processing engine 802.

In order to achieve faster computations, few computational performance improvement techniques have been used and implemented in the CNN processing block 804. In one embodiment, representation of imagery data uses as few bits as practical (e.g., 5-bit representation). In another embodiment, each filter coefficient is represented as an integer with a radix point. Similarly, the integer representing the filter coefficient uses as few bits as practical (e.g., 12-bit representation). As a result, 3×3 convolutions can then be performed using fixed-point arithmetic for faster computations.

Each 3×3 convolution produces one convolution operations result, Out(m, n), based on the following formula:

$$\text{Out}(m, n) = \sum_{1 \le i,j \le 3} \text{In}(m, n, i, j) \times C(i, j) - b \quad (1)$$

where:
m, n are corresponding row and column numbers for identifying which imagery data (pixel) within the (Z+2)-pixel by (Z+2)-pixel region the convolution is performed;
In(m,n,i,j) is a 3-pixel by 3-pixel area centered at pixel location (m, n) within the region;
C(i, j) represents one of the nine weight coefficients C(3×3), each corresponds to one of the 3-pixel by 3-pixel area;
b represents an offset or bias coefficient; and
i, j are indices of weight coefficients C(i, j).

Each CNN processing block 804 produces Z×Z convolution operations results simultaneously and, all CNN processing engines perform simultaneous operations. In one embodiment, the 3×3 weight or filter coefficients are each 12-bit while the offset or bias coefficient is 16-bit or 18-bit.

Figure 10A:
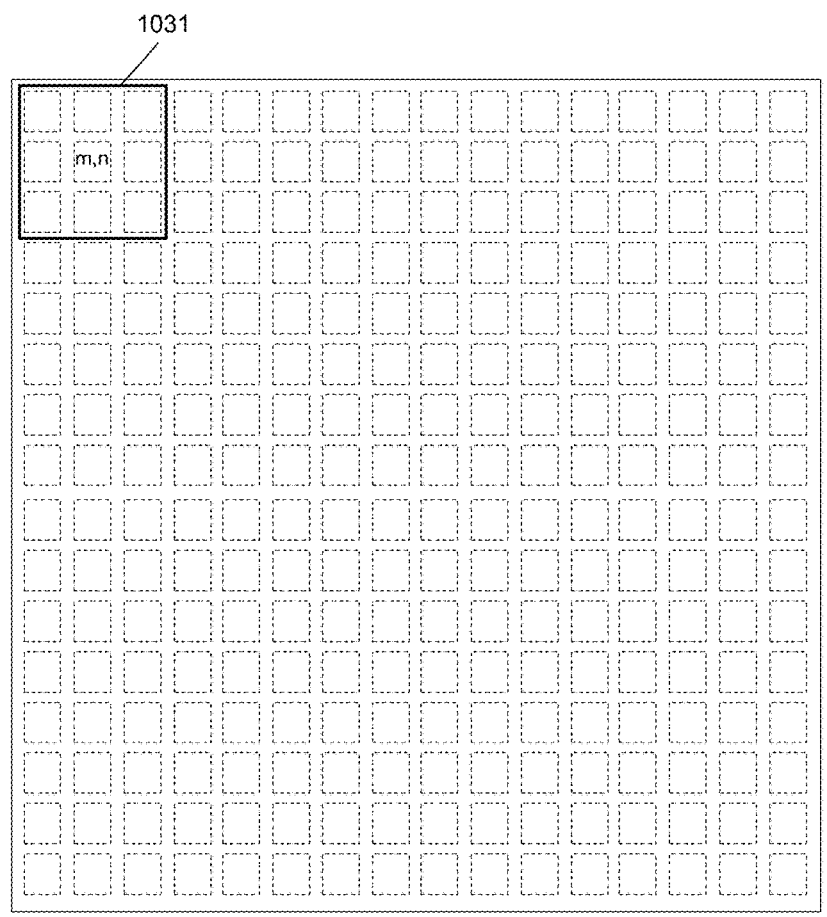
FIGS. 10A-10C are diagrams showing three example pixel locations within the example imagery data region of FIG. 9, according to an embodiment of the invention.
Figure 10B:
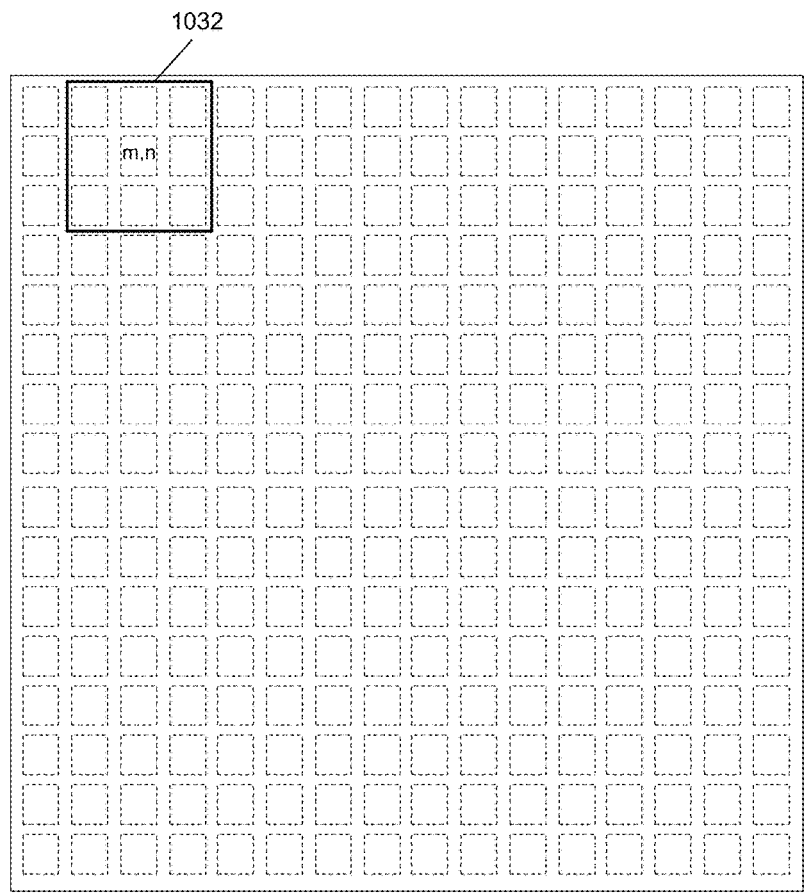
Figure 10C:
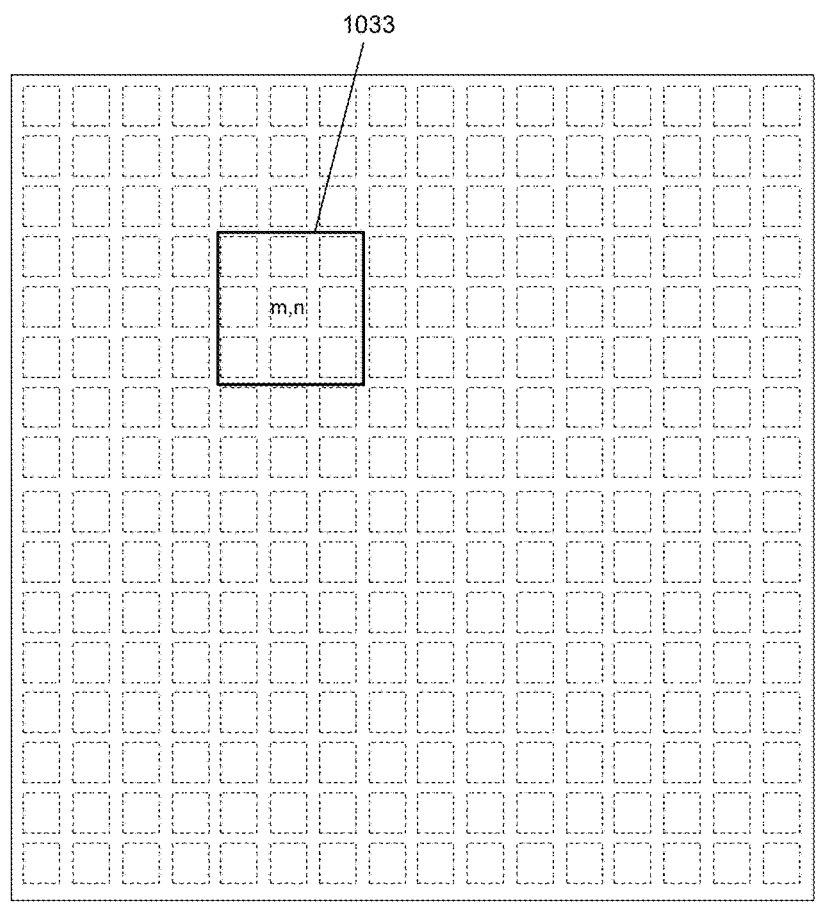

FIGS. 10A-10C show three different examples of the Z×Z pixel locations. The first pixel location 1031 shown in FIG. 10A is in the center of a 3-pixel by 3-pixel area within the (Z+2)-pixel by (Z+2)-pixel region at the upper left corner. The second pixel location 1032 shown in FIG. 10B is one pixel data shift to the right of the first pixel location 1031. The third pixel location 1033 shown in FIG. 10C is a typical example pixel location. Z×Z pixel locations contain multiple overlapping 3-pixel by 3-pixel areas within the (Z+2)-pixel by (Z+2)-pixel region.

Figure 11:
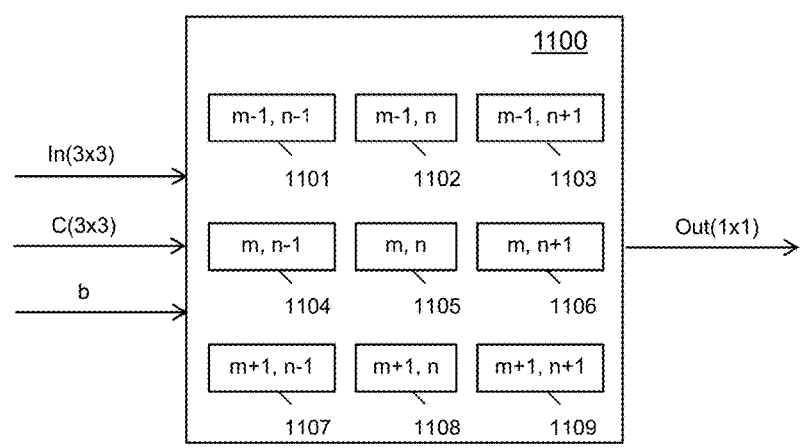
FIG. 11 is a diagram illustrating an example data arrangement for performing 3×3 convolutions at a pixel location in the example CNN processing engine of FIG. 8, according to one embodiment of the invention.

To perform 3×3 convolutions at each sampling location, an example data arrangement is shown in FIG. 11. Imagery data (i.e., In(3×3)) and filter coefficients (i.e., weight coefficients C(3×3) and an offset coefficient b) are fed into an example CNN 3×3 circuitry 1100. After 3×3 convolutions operation in accordance with Formula (1), one output result (i.e., Out(1×1)) is produced. At each sampling location, the imagery data In(3×3) is centered at pixel coordinates (m, n) 1105 with eight immediate neighbor pixels 1101-1104, 1106-1109.

Imagery data are stored in a first set of memory buffers 806, while filter coefficients are stored in a second set of memory buffers 808. Both imagery data and filter coefficients are fed to the CNN block 804 at each clock of the digital integrated circuit. Filter coefficients (i.e., C(3×3) and b) are fed into the CNN processing block 804 directly from the second set of memory buffers 808. However, imagery data are fed into the CNN processing block 804 via a multiplexer MUX 805 from the first set of memory buffers 806. Multiplexer 805 selects imagery data from the first set of memory buffers based on a clock signal (e.g., pulse 812).

Otherwise, multiplexer MUX 805 selects imagery data from a first neighbor CNN processing engine (from the left side of FIG. 8 not shown) through a clock-skew circuit 820.

At the same time, a copy of the imagery data fed into the CNN processing block 804 is sent to a second neighbor CNN processing engine (to the right side of FIG. 8 not shown) via the clock-skew circuit 820. Clock-skew circuit 820 can be achieved with known techniques (e.g., a D flip-flop 822).

After 3×3 convolutions for each group of imagery data are performed for predefined number of filter coefficients, convolution operations results Out(m, n) are sent to the first set of memory buffers via another multiplex MUX 807 based on another clock signal (e.g., pulse 811). An example clock cycle 810 is drawn for demonstrating the time relationship between pulse 811 and pulse 812. As shown pulse 811 is one clock before pulse 812, as a result, the 3×3 convolution operations results are stored into the first set of memory buffers after a particular block of imagery data has been processed by all CNN processing engines through the clock-skew circuit 820.

After the convolution operations result Out(m, n) is obtained from Formula (1), activation procedure may be performed. Any convolution operations result, Out(m, n), less than zero (i.e., negative value) is set to zero. In other words, only positive value of output results are kept. For example, positive output value 10.5 retains as 10.5 while −2.3 becomes 0. Activation causes non-linearity in the CNN based integrated circuits.

If a 2×2 pooling operation is required, the Z×Z output results are reduced to (Z/2)×(Z/2). In order to store the (Z/2)×(Z/2) output results in corresponding locations in the first set of memory buffers, additional bookkeeping techniques are required to track proper memory addresses such that four (Z/2)×(Z/2) output results can be processed in one CNN processing engine.

Figure 12A:
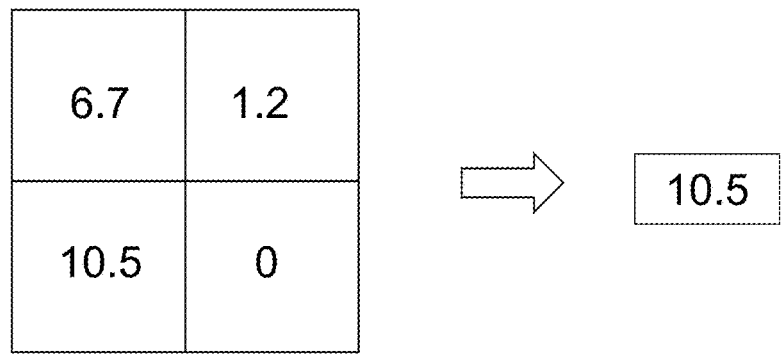
FIGS. 12A-12B are diagrams showing two example 2×2 pooling operations according to an embodiment of the invention.
Figure 12B:
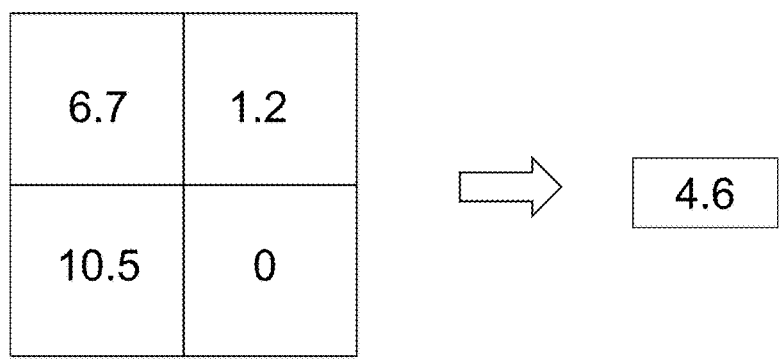
Figure 13:
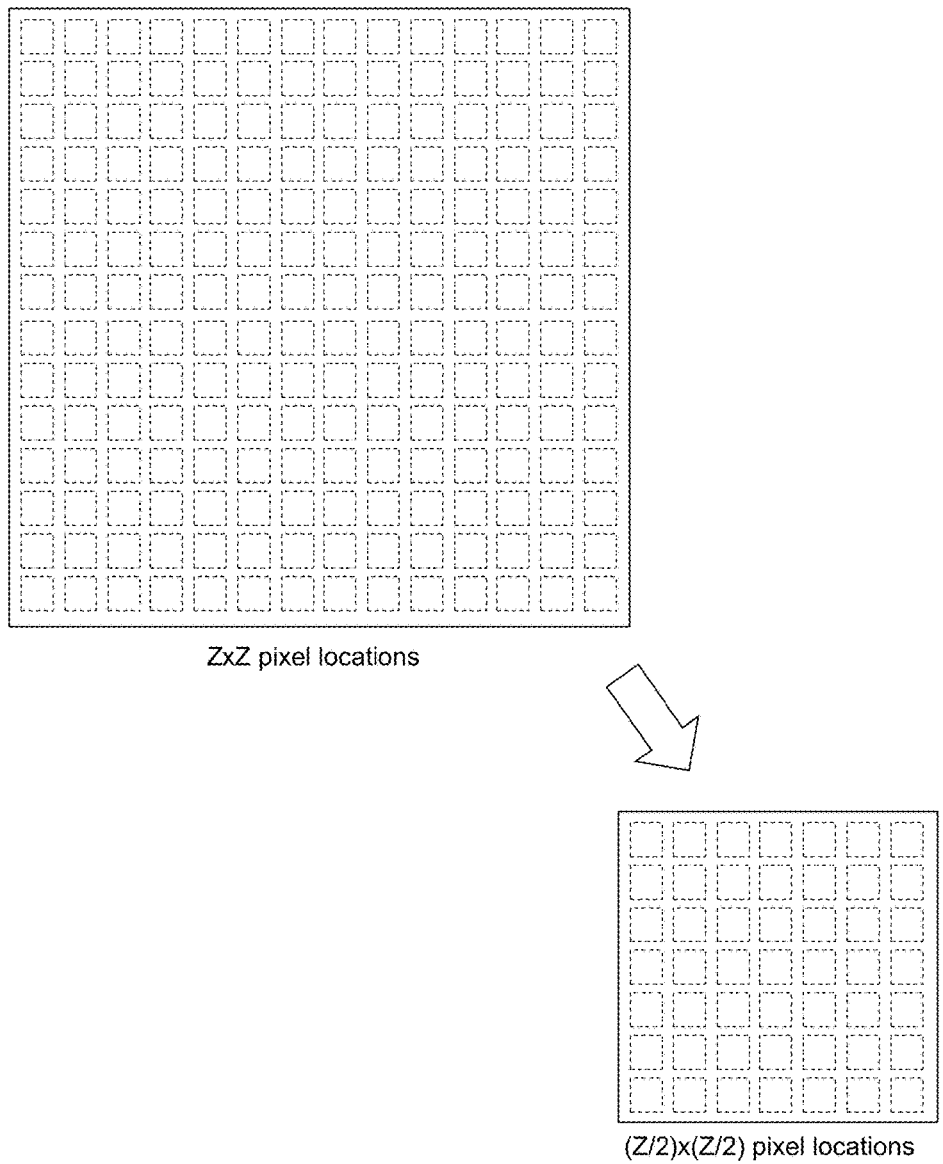
FIG. 13 is a diagram illustrating a 2×2 pooling operation of an imagery data in the example CNN processing engine of FIG. 8, according to one embodiment of the invention.

To demonstrate a 2×2 pooling operation, FIG. 12A is a diagram graphically showing first example output results of a 2-pixel by 2-pixel block being reduced to a single value 10.5, which is the largest value of the four output results. The technique shown in FIG. 12A is referred to as "max pooling". When the average value 4.6 of the four output results is used for the single value shown in FIG. 12B, it is referred to as "average pooling". There are other pooling operations, for example, "mixed max average pooling" which is a combination of "max pooling" and "average pooling". The main goal of the pooling operation is to reduce the size of the imagery data being processed. FIG. 13 is a diagram illustrating Z×Z pixel locations, through a 2×2 pooling operation, being reduced to (Z/2)×(Z/2) locations, which is one fourth of the original size.

Figure 14A:
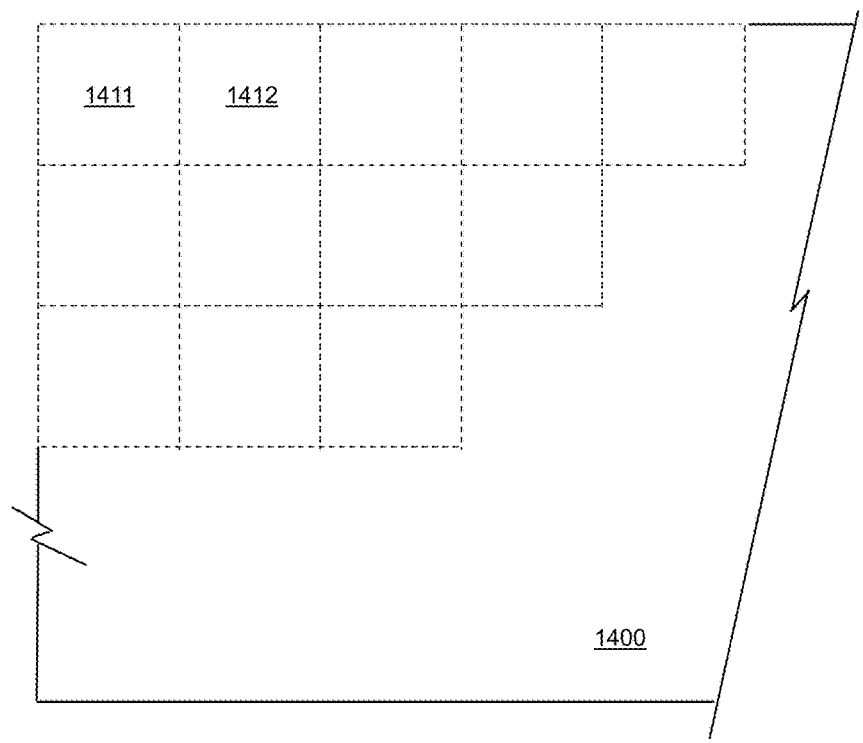
FIGS. 14A-14C are diagrams illustrating various examples of imagery data region within an input image, according to one embodiment of the invention.

An input image generally contains a large amount of imagery data. In order to perform image processing operations, an example input image 1400 (e.g., a two-dimensional symbol 100 of FIG. 1) is partitioned into Z-pixel by Z-pixel blocks 1411-1412 as shown in FIG. 14A. Imagery data associated with each of these Z-pixel by Z-pixel blocks is then fed into respective CNN processing engines. At each of the Z×Z pixel locations in a particular Z-pixel by Z-pixel block, 3×3 convolutions are simultaneously performed in the corresponding CNN processing block.

Although there is no requirement for specific characteristic dimension of an input image, the input image may be required to resize to fit into a predefined characteristic dimension for certain image processing procedures. In an embodiment, a square shape with ($2^L$×Z)-pixel by ($2^L$×Z)-pixel is required. L is a positive integer (e.g., 1, 2, 3, 4, etc.). When Z equals 14 and L equals 4, the characteristic dimension is 224. In another embodiment, the input image is a rectangular shape with dimensions of ($2^I$×Z)-pixel and ($2^J$×Z)-pixel, where I and J are positive integers.

Figure 14B:
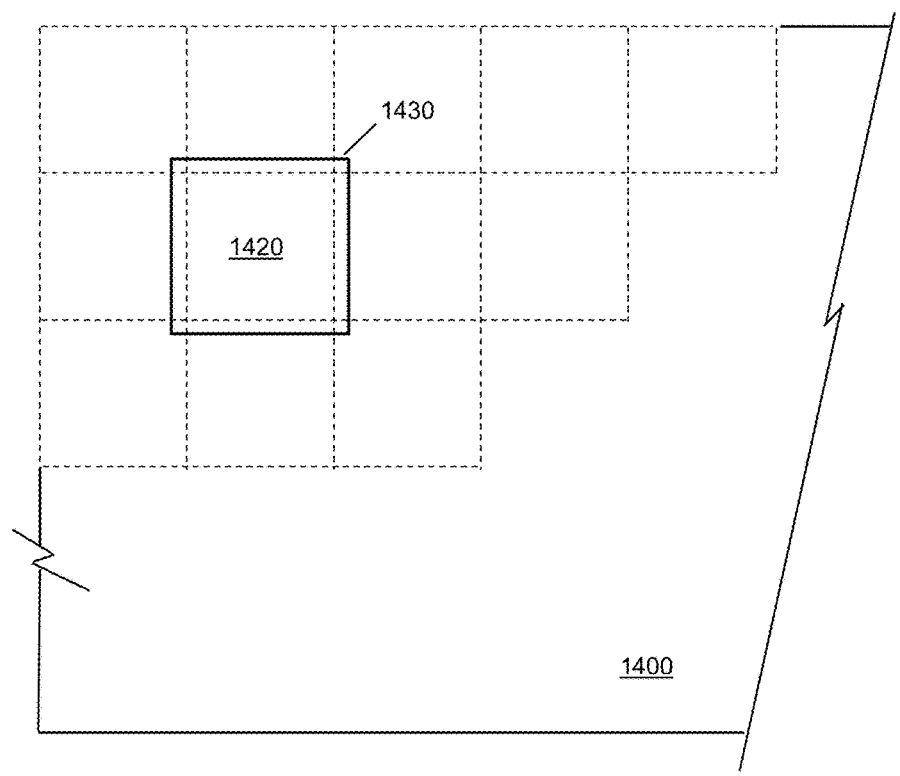

In order to properly perform 3×3 convolutions at pixel locations around the border of a Z-pixel by Z-pixel block, additional imagery data from neighboring blocks are required. FIG. 14B shows a typical Z-pixel by Z-pixel block 1420 (bordered with dotted lines) within a (Z+2)-pixel by (Z+2)-pixel region 1430. The (Z+2)-pixel by (Z+2)-pixel region is formed by a central portion of Z-pixel by Z-pixel from the current block, and four edges (i.e., top, right, bottom and left) and four corners (i.e., top-left, top-right, bottom-right and bottom-left) from corresponding neighboring blocks.

Figure 14C:
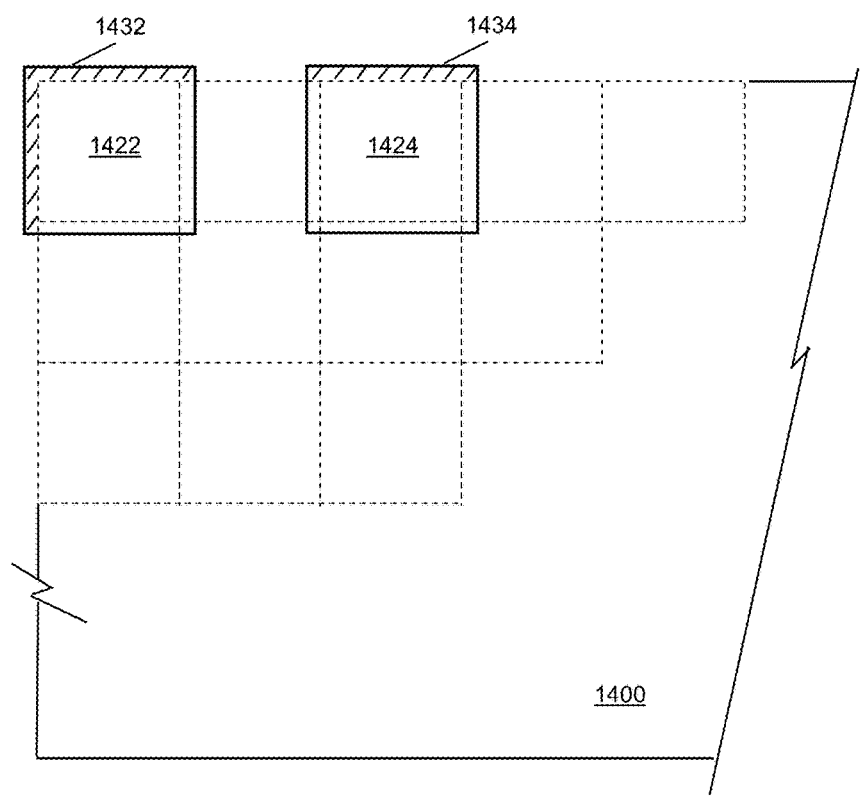

FIG. 14C shows two example Z-pixel by Z-pixel blocks 1422-1424 and respective associated (Z+2)-pixel by (Z+2)-pixel regions 1432-1434. These two example blocks 1422-1424 are located along the perimeter of the input image. The first example Z-pixel by Z-pixel block 1422 is located at top-left corner, therefore, the first example block 1422 has neighbors for two edges and one corner. Value "0"s are used for the two edges and three corners without neighbors (shown as shaded area) in the associated (Z+2)-pixel by (Z+2)-pixel region 1432 for forming imagery data. Similarly, the associated (Z+2)-pixel by (Z+2)-pixel region 1434 of the second example block 1424 requires "0"s be used for the top edge and two top corners. Other blocks along the perimeter of the input image are treated similarly. In other words, for the purpose to perform 3×3 convolutions at each pixel of the input image, a layer of zeros ("0"s) is added outside of the perimeter of the input image. This can be achieved with many well-known techniques. For example, default values of the first set of memory buffers are set to zero. If no imagery data is filled in from the neighboring blocks, those edges and corners would contain zeros.

Figure 15:
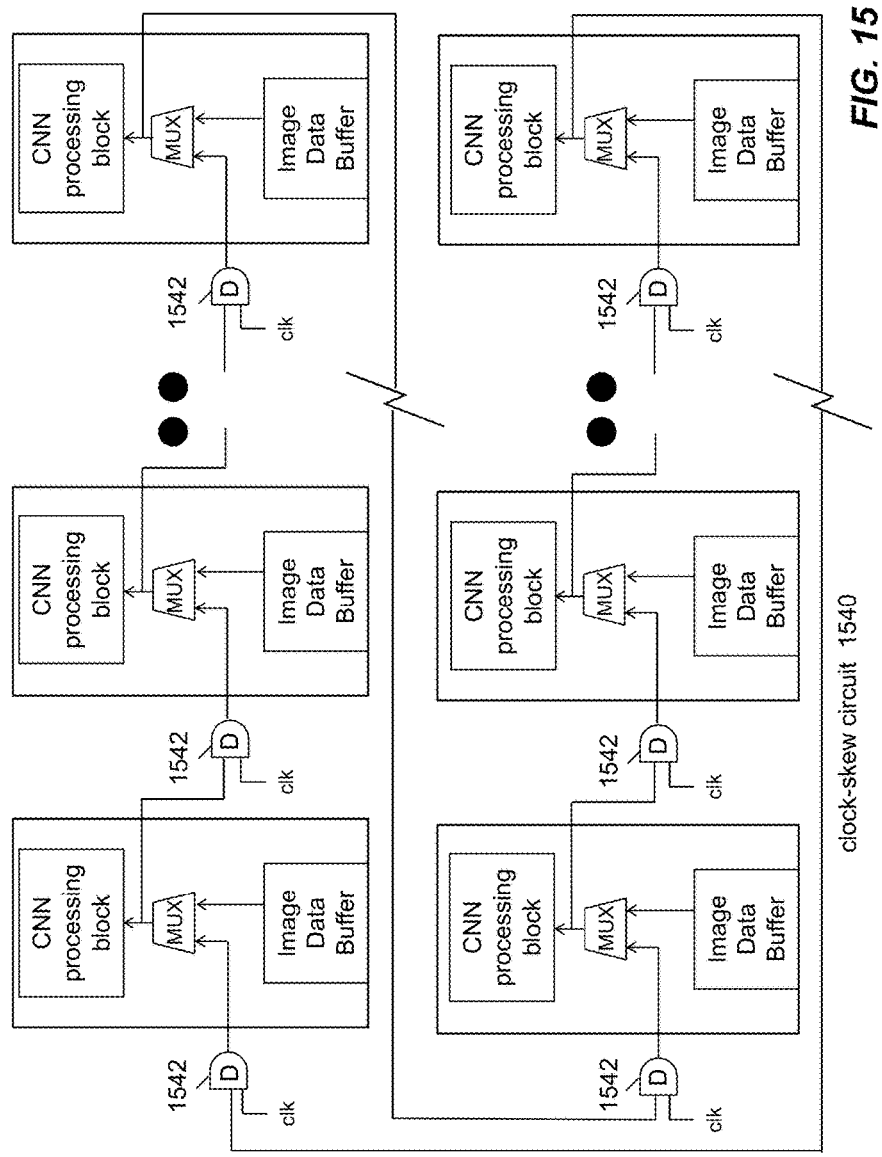
FIG. 15 is a diagram showing a plurality of CNN processing engines connected as a loop via an example clock-skew circuit in accordance of an embodiment of the invention.

When more than one CNN processing engine is configured on the integrated circuit. The CNN processing engine is connected to first and second neighbor CNN processing engines via a clock-skew circuit. For illustration simplicity, only CNN processing block and memory buffers for imagery data are shown. An example clock-skew circuit 1540 for a group of example CNN processing engines are shown in FIG. 15.

CNN processing engines connected via the second example clock-skew circuit 1540 to form a loop. In other words, each CNN processing engine sends its own imagery data to a first neighbor and, at the same time, receives a second neighbor's imagery data. Clock-skew circuit 1540 can be achieved with well-known manners. For example, each CNN processing engine is connected with a D flip-flop 1542.

In order to use 2-D symbols in a natural language translation device (e.g., devices 2100, 2200) that translates a source sentence in first natural language to a target sentence in second natural language one word at a time in sequential order, the super-character contained in the 2-D symbol is designed to possess a characteristic suggesting the i-th word of the target sentence. Three such example 2-D symbols are shown in FIGS. 16-18.

The first example 2-D symbol 1620 shown in FIG. 16 is divided into the upper part 1621 and the lower part 1622. There are other schemes to divide the first 2-D symbol 1620, for example, left half and right half. The upper part 1621 includes ideograms created from the words in the entire source sentence 1610. Each ideogram corresponds to a word in the source sentence 1610. In this example, the source sentence contains words ($S_1, S_2, S_3, \ldots, S_{n-2}, S_{n-1}, S_n$). Any remaining space in the upper part 1621 is filled with blank or default. The lower part 1622 includes ideograms created from the already-translated portion 1641 of the target sentence 1640. Any remaining space in the lower part 1622 is filled with blank or default. Already-translated portion 1641 corresponds to partial target sentence ($T_1, T_2, \ldots, T_{i-2}, T_{i-1}$) which are the characteristics suggesting the i-th word ($T_i$) 1630 of the target sentence 1640. Each ideogram in the lower part 1622 corresponds to one of the words in the already-translated portion 1641 of the target sentence 1640.

FIG. 17 shows the second example 2-D symbol 1720. This symbol 1720 contains the i-th word ($S_i$) 1711 of the source sentence 1710, including a predetermined number of words before and after the i-th word ($S_i$) 1711. The second example 2-D symbol 1720 demonstrates eight words preceding and seven succeeding the i-th word ($S_i$) 1711, but such specific numbers are predetermined based on different natural languages used in the translation. Blank buffer spaces are extended to either end of the source sentence 1710 as necessary. For example, when the first word (i.e., i=1), eight preceding blank buffer spaces are used for creating the 2-D symbol.

In order to provide the characteristic suggesting the i-th word ($T_i$) 1730 of the target sentence 1740. The ideogram representing the i-th word ($S_i$) 1711 of the source sentence 1710 is placed in a predefined location 1722 in the 2-D symbol 1720.

The third example 2-D symbol 1820 is shown in FIG. 18. The third example 2-D symbol 1820 is divided into a predetermined number of sub-symbols. In this example, there are four sub-symbols 1821-1824. Other predetermined number may be used for achieving the same, for example, nine or any other positive integers. Then, four corresponding groups of consecutive words with each group encompasses the i-th word ($S_1$) 1811 of the source sentence 1810. The third example 2-D symbol 1820 is formed by including ideograms converted from respective groups of consecutive words for all sub-symbols 1821-1824. Similar to first and second example 2-D symbols, the third example 2-D symbol 1820 possesses a characteristic suggesting the i-th word ($T_i$) 1830 of the target sentence 1840.

Figure 19:
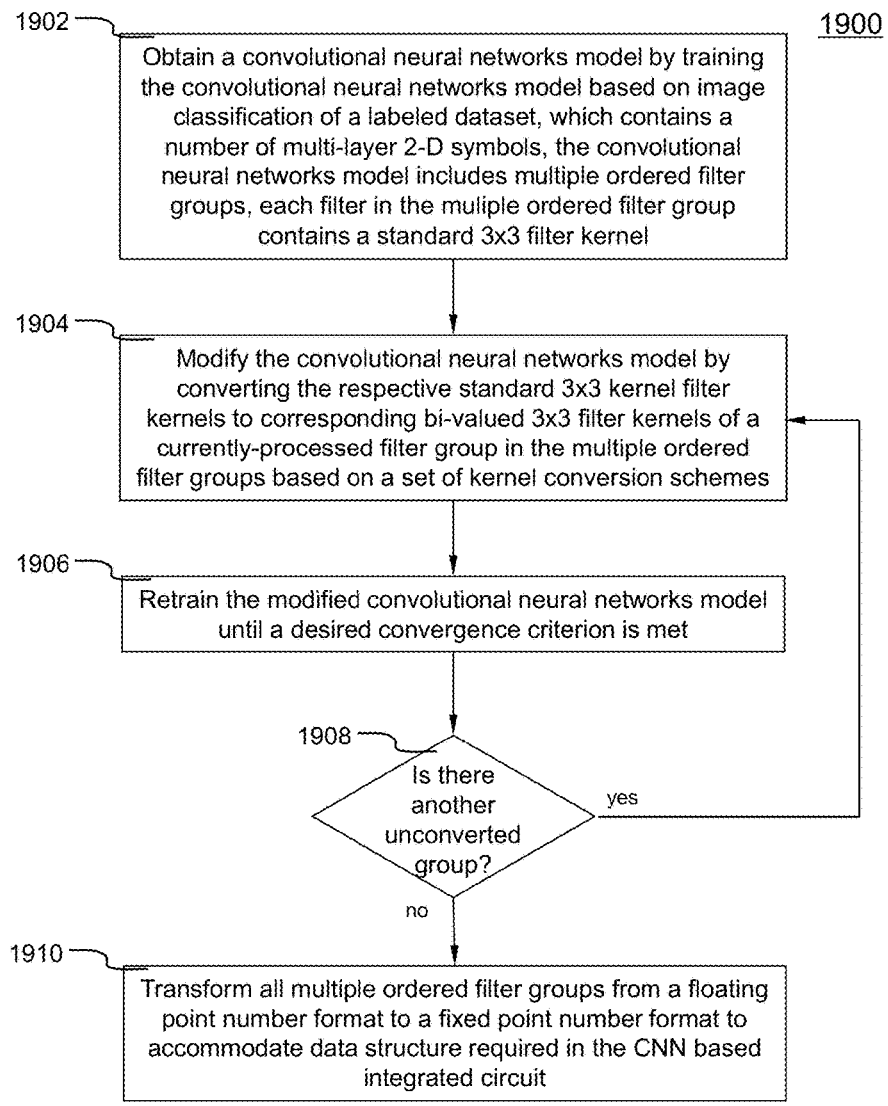
FIG. 19 is a flowchart illustrating an example process of achieving a trained convolutional neural networks model having bi-valued 3×3 filter kernels in accordance with an embodiment of the invention.

Training of a deep or machine learning model (e.g., convolutional neural networks) can be achieved with an example set of operations 1900 shown in FIG. 19. At action 1902, a deep learning model is trained by learning the image category or class of a labeled dataset, which contains a sufficiently large number of multi-layer 2-D symbols. For example, there are at least many thousands of 2-D symbols for each category. In other words, each 2-D symbol in the labeled dataset is associated with a category to be classified. The deep learning model includes multiple ordered convultional layers or filter groups. Each filter in the multiple ordered filter groups contains a standard 3×3 filter kernel (i.e., nine coefficients in floating point number format (e.g., standard 3×3 filter kernel 2010 in FIG. 20B)). Each of the nine coefficients can be any negative or positive real number (i.e., a number with fraction). The initial deep learning model may be obtained from many different frameworks including, but not limited to, Mxnet, caffe, tensorflow, etc.

Figure 20A:
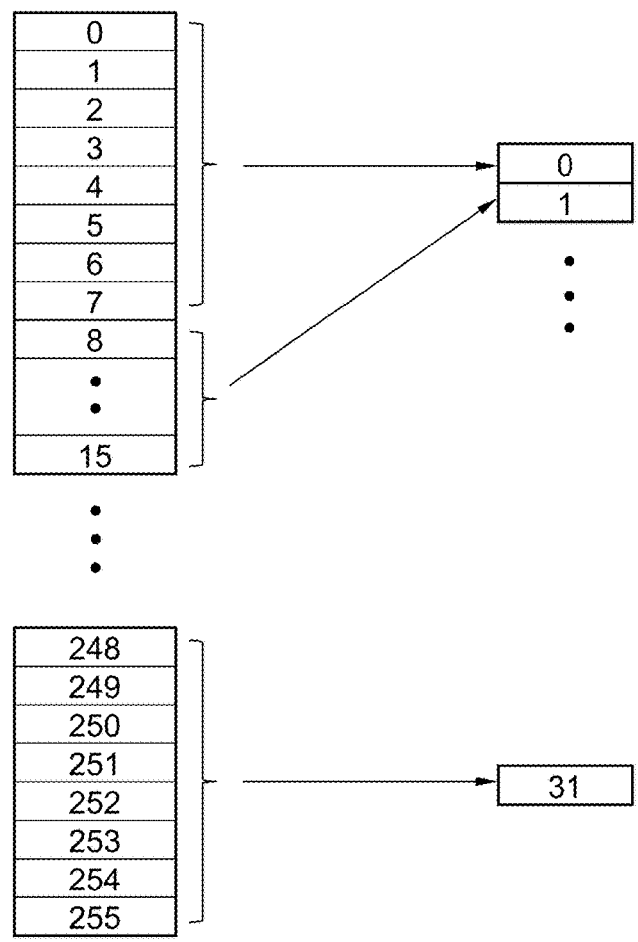
FIG. 20A is a diagram showing an example data conversion scheme.
Figure 20B:
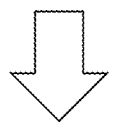
FIG. 20B is a diagram showing an example filter kernel conversion scheme in accordance with the invention.

Then, at action 1904, the deep learning model is modified by converting respective standard 3×3 filter kernels 2010, shown in FIG. 20B, to corresponding bi-valued 3×3 filter kernels 2020 of a currently-processed filter group in the multiple ordered filter groups based on a set of kernel conversion schemes. In one embodiment, each of the nine coefficients C(i,j) in the corresponding bi-valued 3×3 filter kernel 2020 is assigned a value 'A' equal to the average of absolute coefficient values multiplied by the sign of corresponding coefficients in the standard 3×3 filter kernel 2010 shown in following formula:

$$A = \sum_{1 \le i,j \le 3} |C(i,j)|/9 \quad (2)$$

Filter groups are converted one at a time in the order defined in the multiple ordered filter groups. In certain situation, two consecutive filter groups are optionally combined such that the training of the convolutional neural networks model is more efficient.

Next, at action 1906, the modified deep learning model is retrained until a desired convergence criterion is met or achieved. There are a number of well known convergence criteria including, but not limited to, completing a predefined number of retraining operation, converging of accuracy loss due to filter kernel conversion, etc. In one embodiment, all filter groups including already converted in previous retraining operations can be changed or altered for fine tuning. In another embodiment, the already converted filter groups are frozen or unaltered during the retraining operation of the currently-processed filter group.

Process 1900 moves to decision 1908, it is determined whether there is another unconverted filter group. If 'yes', process 1900 moves back to repeat actions 1904-1906 until all filter groups have been converted. Decision 1908 becomes 'no' thereafter. At action 1910, coefficients of bi-valued 3×3 filter kernels in all filter groups are transformed from a floating point number format to a fixed point number format to accommodate the data structure required in the CNN based integrated circuit. Furthermore, the fixed point number is implemented as reconfigurable circuits in the CNN based integrated circuit. In one embodiment, the coefficients are implemented using a fixed point number format with 12-bit mantissa, 2-bit exponent and 1-bit for sign. The fixed point number format can be adapted in accordance with different types of input imagery data.

FIG. 20A is a diagram showing an example data conversion scheme for converting an imagery data (e.g., 2-D symbol) from 8-bit [0-255] to 5-bit [0-31] per pixel. For example, bits 0-7 becomes 0, bits 8-15 becomes 1, etc.

A first example natural language translation device 2100 is shown in FIG. 21. The first example device 2100 contains at least an input interface 2116 (e.g., camera, scanner, touch screen, tablet pen, keyboard, etc.), a processing unit 2112 (e.g., computer central processing unit, computer graphics processing unit. etc.), a CNN based integrated circuit 2102 (e.g., CNN based integrated circuit 400 in FIG. 4A), a memory 2104 (e.g., Dynamic Random Access Memory or other suitable alternative storage), and a display unit 2118 (e.g., display screen). All of which are operatively connected to a bus 2110.

The first example natural language translation device 2100 is an embedded system using CNN based integrated circuit 2102 for computations of convolutional layers using pre-trained filter coefficients stored therein. Memory 2104 is configured for storing at least the received source sentence. The processing unit 2112 controls input interface 2116 to receive a source sentence in a first natural language to be translated to a target sentence in a second natural language one word at a time in sequential order. Processing unit 2112 then forms a two-dimensional (2-D) symbol in accordance with a set of 2-D symbol creation rules using a 2-D symbol creation module installed thereon. The 2-D symbol contains a super-character having a characteristic suggesting the i-th word of the target sentence based on the received source sentence. Example 2-D symbols are shown in FIGS. 16-18.

The 2-D symbol is an imagery data that can be classified using a CNN based integrated circuit 2102 via a deep learning model. The deep learning model contained at least multiple ordered convolutional layers, fully-connected layers, pooling operations and activation operations. Display device 2118 displays already-translated portion of the target sentence. Because the translation is performed one word at a time in a sequential order, the entire target sentence is shown at the end of translation.

Multiple ordered convolutional layers contain pre-trained filter coefficients in forms of bi-valued 3×3 filter kernels. Each of the bi-valued 3×3 filter kernels contains fixed point number with positive or negative of same numerical value. An example of bi-valued 3×3 filter kernel is shown in FIG.

20B. The filter coefficients for convolutional layers and weight coefficients for fully-connected layers are trained using a labeled database containing sufficient amount of imagery data categorized with a set of defined classes (i.e., words of the second natural language). Training of deep learning model can be performed using process 1900 in FIG. 19. Training can also be performed directly using bi-valued 3×3 filter kernels without any transformation from floating point number format to fixed point number format.

FIG. 22 shows a second example natural language translation device 2200, which contains a dongle 2201 and a host 2200 (e.g., a mobile phone) connected through a bus 2210 (e.g., USB—Universal Serial Bus).

Dongle 2201 contains a CNN based integrated circuit 2202 and a DRAM (Dynamic Random Access Memory) 2204. Host 2220 contains a processing unit 2222, memory 2224, input interface 2226 and display screen 2228. In one embodiment, when the host 2220 is a mobile phone, the input means 2226 can be through the display screen 2228 as touch screen input.

Although the invention has been described with reference to specific embodiments thereof, these embodiments are merely illustrative, and not restrictive of, the invention. Various modifications or changes to the specifically disclosed example embodiments will be suggested to persons skilled in the art. For example, whereas the second example 2-D symbol 1720 has been shown and described with the i-th word 1711 at the left most position 1722 in the lower half. Other locations within the 2-D symbol 1720 may be used for achieving the same. Additionally, whereas the third example 2-D symbol 1820 has been shown and described with four groups, the invention does not set a limit to the number of groups, other numbers of groups may be used, for example, nine groups. Furthermore, whereas the example 2-D symbol has been shown and described to contain 16 ideograms, other number of ideograms may be used, for example, 25. Finally, whereas the two-dimensional symbol has been described and shown with a specific example of a matrix of 224×224 pixels, other sizes may be used for achieving substantially similar objections of the invention. In summary, the scope of the invention should not be restricted to the specific example embodiments disclosed herein, and all modifications that are readily suggested to those of ordinary skill in the art should be included within the spirit and purview of this application and scope of the appended claims.

What is claimed is:

1. A natural language translation device comprising:
   a bus;
   an input interface operatively connecting to the bus for receiving a source sentence in a first natural language to be translated to a target sentence in second natural language one word at a time in sequential order;
   a processing unit operatively connecting to the bus for forming a two-dimensional (2-D) symbol in accordance with a set of 2-D symbol creation rules using a 2-D symbol creation module installed thereon, the 2-D symbol containing a super-character having a characteristic suggesting the i-th word of the target sentence based on the received source sentence; and
   a Cellular Neural Networks or Cellular Nonlinear Networks (CNN) based integrated circuit operatively connecting to the bus for classifying the 2-D symbol via a deep learning model that contains a plurality of ordered convolutional layers.

2. The device of claim 1, further comprises a display unit operatively connecting to the bus for displaying already-translated portion of the target sentence.

3. The device of claim 1, wherein the 2-D symbol comprises a matrix of N×N pixels of K-bit data, and the matrix is divided into M×M sub-matrices with each of the sub-matrices containing (N/M)×(N/M) pixels, said each of the sub-matrices representing one ideogram, where K, N and M are positive integers or whole numbers, and N is a multiple of M.

4. The device of claim 1, wherein the set of 2-D symbol creation rules comprises:
   dividing the 2-D symbol into first and second parts;
   converting the source sentence to a first set of ideograms;
   converting the first word to the (i−1)-th word of the target sentence to a second set of ideograms; and
   forming the 2-D symbol by including the first set of ideograms in the first part and including the second set of ideograms in the second part.

5. The device of claim 1, wherein the set of 2-D symbol creation rules comprises:
   converting the source sentence to a set of ideograms;
   dividing the 2-D symbol into a predetermined number of sub-symbols with each sub-symbol for one ideogram; and
   forming the 2-D symbol by including relevant portion of the set of ideograms in a scheme such that the ideogram corresponding to the i-th word is located in a predefined location, by filling each unoccupied sub-symbol with blank space if needed.

6. The device of claim 1, wherein the set of 2-D symbol creation rules comprises:
   dividing the 2-D symbol into a predetermined number of sub-symbols;
   creating the predetermined number of groups of consecutive words from the source sentence with each group encompassing the i-th word of the source sentence and said each group corresponding to one of the sub-symbols; and
   forming the 2-D symbol by including ideograms converted from respective groups of consecutive words for all sub-symbols.

7. The device of claim 1, wherein the CNN based integrated circuit comprises a plurality of CNN processing engines operatively coupled to at least one input/output data bus, the plurality of CNN processing engines being connected in a loop with a clock-skew circuit, each CNN processing engine comprising:
   a CNN processing block configured for simultaneously performing convolutional operations using the 2-D symbol and pre-trained filter coefficients of the plurality of ordered convolutional layers;
   a first set of memory buffers operatively coupling to the CNN processing block for storing the 2-D symbol; and
   a second set of memory buffers operatively coupling to the CNN processing block for storing the pre-trained filter coefficients.

8. The device of claim 7, wherein the pre-trained filter coefficients comprises multiple bi-valued 3×3 filter kernels.

9. The device of claim 8, wherein each of the bi-valued 3×3 filter kernels contains fixed point number with positive or negative of same numerical value.

10. The device of claim 7, wherein the CNN based integrated circuit further performs pooling operations and activation operations.

11. The device of claim 1, further comprises a memory operatively connected to the bus for providing data storage for the processing unit.

12. A method of translating natural language using a Cellular Neural Networks or Cellular Nonlinear Networks (CNN) based integrated circuit, the method comprising:

receiving, in a natural language translation device having a two-dimensional (2-D) symbol creation module installed thereon, a source sentence in a first natural language to be translated to a target sentence in second natural language one word at a time in sequential order;

forming, with the 2-D symbol creation module, a multi-layer two-dimensional (2-D) symbol in accordance with a set of 2-D symbol creation rules, the 2-D symbol being a matrix of N×N pixels of K-bit data that contains a super-character, the matrix being divided into M×M sub-matrices with each of the sub-matrices containing (N/M)×(N/M) pixels, said each of the sub-matrices representing one ideogram, the super-character having a characteristic suggesting the i-th word of the target sentence based on the received source sentence, where K, N and M are positive integers or whole numbers, and N is a multiple of M; and obtaining, with the 2-D symbol creation module, the i-th word of the target sentence by classifying the 2-D symbol via a deep learning model having a plurality of ordered convolution layers in a Cellular Neural Networks or Cellular Nonlinear Networks (CNN) based integrated circuit.

13. The method of claim 12, further comprises displaying already-translated portion of the target sentence in a display unit of the natural language translation device.

14. The method of claim 12, wherein the set of 2-D symbol creation rules comprises:

dividing the 2-D symbol into first and second parts;

converting the source sentence to a first set of ideograms;

converting the first word to the (i−1)-th word of the target sentence to a second set of ideograms; and forming the 2-D symbol by including the first set of ideograms in the first part and including the second set of ideograms in the second part.

15. The method of claim 12, wherein the set of 2-D symbol creation rules comprises:

converting the source sentence to a set of ideograms;

dividing the 2-D symbol into a predetermined number of sub-symbols with each sub-symbol for one ideogram; and forming the 2-D symbol by including relevant portion of the set of ideograms in a scheme such that the ideogram corresponding to the i-th word is located in a predefined location, by filling each unoccupied sub-symbol with blank space if needed.

16. The method of claim 12, wherein the set of 2-D symbol creation rules comprises:

dividing the 2-D symbol into a predetermined number of sub-symbols;

creating the predetermined number of groups of consecutive words from the source sentence with each group encompassing the i-th word of the source sentence and said each group corresponding to one of the sub-symbols; and forming the 2-D symbol by including ideograms converted from respective groups of consecutive words for all sub-symbols.

17. The method of claim 12, wherein the CNN based integrated circuit comprises a plurality of CNN processing engines operatively coupled to at least one input/output data bus, the plurality of CNN processing engines being connected in a loop with a clock-skew circuit, each CNN processing engine comprising:

a CNN processing block configured for simultaneously performing convolutional operations using the 2-D symbol and pre-trained filter coefficients of the plurality of ordered convolutional layers;

a first set of memory buffers operatively coupling to the CNN processing block for storing the 2-D symbol; and a second set of memory buffers operatively coupling to the CNN processing block for storing the pre-trained filter coefficients.

18. The method of claim 17, wherein the pre-trained filter coefficients comprises multiple bi-valued 3×3 filter kernels.

19. The method of claim 18, wherein each of the bi-valued 3×3 filter kernels contains fixed point number with positive or negative of same numerical value.

20. The method of claim 17, wherein the CNN based integrated circuit further performs pooling operations and activation operations.

* * * * *